United States Patent [19]
Lindberg

[11] 3,821,620
[45] June 28, 1974

[54] ELECTRIC INDUCTION MOTOR AND CONTROL SYSTEM

[75] Inventor: Allan W. Lindberg, Kirkwood, Mo.
[73] Assignee: Emerson Electric Co., St. Louis, Mo.
[22] Filed: May 15, 1972
[21] Appl. No.: 253,189

[52] U.S. Cl.............. 318/227, 318/230, 318/328, 310/59, 310/63, 310/112
[51] Int. Cl. ........................................... H02p 5/40
[58] Field of Search .......... 318/217, 218, 219, 227, 318/230, 326, 327, 328; 322/31; 310/59, 63, 112

[56] References Cited
UNITED STATES PATENTS

| | | | |
|---|---|---|---|
| 1,242,937 | 10/1917 | Hellmund | 318/219 |
| 1,509,985 | 9/1924 | Slepian | 318/219 |
| 2,304,617 | 12/1942 | Werner et al. | 318/219 X |
| 3,177,387 | 4/1965 | Leischner | 310/112 X |
| 3,250,974 | 5/1966 | Wallace | 318/219 X |
| 3,582,743 | 6/1971 | Diaz et al. | 318/328 X |
| 3,611,090 | 10/1971 | Johnston | 322/31 |

Primary Examiner—Gene Z. Rubinson
Attorney, Agent, or Firm—Polster and Polster

[57] ABSTRACT

A two phase electric induction motor including a rotary phase converter for providing the second phase of power, a fan on the shaft of the rotary phase converter for cooling the motor independent of the shaft speed of the motor, and a speed control powered by the output of the rotary phase converter for controlling the firing angles of triacs in series with the first and second windings of the motor. The speed of the motor is sensed by an electronic tachometer including a pair of induction coils which are electrically coupled to each other across an air gap to form a variable feedback system for a tuned high frequency amplifier. A circuit board disc carried by the motor shaft includes 36 peripheral copper plates which, as they pass through the air gap between the inductors, disturb the coupling between the inductors and produce an output envelope of high frequency AC. The speed control produces a ramp voltage having a slope dependent on a speed control setting and a duration which extends until cut off by a signal from the speed sensor. The ramp voltage is compared with a reference voltage, the excess voltage is converted to a DC level, buffered and fed to a timing logic circuit which increases or decreases the firing angle of the control triacs in accordance with the magnitude and sign of the error signal. The motor system is capable of exerting full torque at virtually any shaft speed, will maintain its shaft speed regardless of changes in shaft load, and will withstand extended service in a locked rotor condition. Other forms of tachometers utilizing a speed sensitive shutter positioned between a light source and a light sensing electronic component, and other speed control systems are also disclosed.

46 Claims, 16 Drawing Figures

PHASE CONVERTER

ELECTRIC INDUCTION MOTOR AND CONTROL SYSTEM

BACKGROUND OF THE INVENTION

This invention relates to an AC induction motor and a control system adapted for use with such a motor. It has particular, but not exclusive, applicability to an electric induction motor which may be energized from a single phase power source, yet which provides full torque over an extended speed range, which will start, run and stop smoothly at all speeds and all load conditions, which will withstand extended service under overload or locked conditions, and will maintain a preselected speed accurately regardless of line voltage fluctuations or variations in motor loading.

Wound rotor, commutator motors have long been recognized as having certain inherent advantages over induction motors. Among these advantages are high starting torque and adaptability for use with accurate speed control systems. Heretofore, it has been believed that these advantages could not, as a practical matter, be attained in an induction motor, particularly an induction motor operated from a single phase power source. Therefore, the expense and upkeep of a commutator motor and its associated control system have been accepted as necessary where these capabilities have been required.

Some prior approaches to speed control systems for induction motors are discussed in the General Electric SCR Manual (4th Edition) at pages 218-223.

Of the various single phase induction motors available for use in a speed control system, only those utilizing a capacitor run (i.e., permanent split capacitor or capacitor start, capacitor run motors) have been considered to be simple enough for practical use in a speed control system and at the same time to provide sufficient starting torque and low enough winding losses. However attempts to achieve satisfactory operation over a wide speed range (three to one or more) and full load variation (no load to stall) have not been successful. The basic reason for such lack of success is that a capacitive (leading power factor) load on an induction machine provides an excitation current which can make the machine act as an induction generator. The generated frequency is lower than the electrical spin speed by an amount due to rotor slip. The tendency for a motor to become so excited is very much greater when it is used in combination with solid state power control. The reason for this relates to the fact that for a normal, fixed speed connection, the power line provides a heavy resistive/inductive load on the machine and for normal design values this load is sufficient to keep the leading power factor current in the capacitor below the critical value at which self-excitation occurs. With the use of solid-state power control connected to a motor in a practical circuit the situation is such that one or both motor windings are not connected to the line for part of each half cycle. This creates a situation in which the capacitor current can dominate and the machine starts to generate low frequency a.c. power. The energy absorbed is considerable and causes the machine to slow down generally to a speed at which the critical excitation is lost and generation stops so the machine then speeds up and the process repeats. This surging, or oscillation may be quite violent under some conditions.

Another problem has been that in applications in which high starting torque is required and in which the motor may be called upon to operate for extended periods at locked rotor or near locked rotor conditions, motors have been required which are greatly oversized or which are provided with special winding insulation to prevent break-down of the stator windings.

One of the objects of this invention is to provide an electric motor system having the advantages of an AC induction machine and also having high starting torque, and the ability to operate under locked rotor or high starting load conditions without damage to the motor system.

Another object is to provide such a system which may be controlled to provide an accurate shaft speed over a range extending substantially from an inching speed to near synchronous speed, which will maintain the preselected speed regardless of line voltage fluctuations or load variations, and which will start, run and stop smoothly at any speed in its range.

Another object is to provide such a motor system which may reverse its direction of rotation rapidly, which provides full power in both rotational directions, and the speed of which may be fully controlled in both rotational directions.

Another object is to provide such a motor system which may, with simple modifications, be utilized with polyphase as well as single phase power.

Another object is to provide such a motor system which is simple, rugged and inexpensive.

Another object is to provide an electronic digital tachometer and a mechanico-optical analog tachometer which are particularly well adapted for use in a motor system and each of which is also useful in other applications.

Other objects and advantages will occur to those skilled in the art in light of the following description and accompanying drawings.

SUMMARY OF THE INVENTION

In accordance with one aspect of this invention, generally stated, an electric motor system is provided which is adapted to operate from a single phase power source and which comprises a rotary phase converter adapted to be energized by the single phase power source and a polyphase induction motor having first and second windings, the first and second windings being electrically connected to the single phase power source and the output of the rotary phase converter respectively. The shaft of the rotary phase converter and polyphase electric motor rotate mechanically independent of each other, and the shaft of the rotary phase converter preferably drives a cooling means such as a fan which cools the polyphase motor independent of the shaft speed of the polyphase motor. Therefore, overheating of the polyphase motor is prevented regardless of the shaft speed of the motor. A control in the excitation circuits of the two windings of the polyphase motor includes gating means for controlling power supply to the windings. The control is energized by the output of the phase converter. Therefore, the polyphase motor is activated only after the phase converter has nearly reached synchronous speed, and the power surge caused by starting of the motor system is reduced. A similar system may be powered from a three-phase power source.

Another aspect of the motor system of the invention is its novel control system, including a novel electronic tachometer. The control system includes both the speed sensing tachometer and means responsive to the tachometer for controlling the gating means of the winding excitation circuit of the controlled motor and thus for maintaining the motor shaft speed at a preselected value. The tachometer includes discrete means carried by the motor shaft, an amplifier having an input and an output, and variable feedback means electrically connected between the input and the output for varying the feedback of the amplifier in response to movement of one of the discrete means past the feedback means. Preferably, the speed sensing means include a pair of reactive means such as induction coils coupled to each other through an air gap and sensing means for sensing a disturbance of the coupling of the reactive means in response to movement of the discrete means into and out of the air gap as the motor shaft rotates. Preferably, the reactive means are parts of oscillator circuits, and when the reactive means are properly coupled they turn on an amplifier to produce an envelope of high frequency alternating energy. The end of each pulse envelope triggers a delay multivibrator which produces a pulse of controlled dimensions to the control circuit. The control circuit includes means for generating a ramp voltage, means responsive to the tachometer output for terminating the ramp in response to a pulse signal from the tachometer, error sensing means for comparing the ramp height with a reference voltage, and a timing logic circuit for changing the "on" time of the gating means in response to the error sensed by the error sensing means. Preferably, the variable speed setting may be set manually, and the change in the speed setting varies the slope of the ramp.

Another aspect of the motor system of the invention is an alternative control system including a novel mechanico-optical tachometer. This tachometer includes a rotating centrifugal part, which is carried by the shaft of the controlled motor and which changes its axial position in response to a change in shaft speed. The centrifugal part moves a shutter part between a light source and a light-sensitive electronic component to produce a signal having a magnitude dependent on the motor shaft speed. This signal is used directly as an error signal to control the ramp slope of a firing circuit.

The control circuits are useful in other motor control systems, and the tachometers are also useful in entirely different systems.

DESCRIPTION OF THE PREFERRED EMBODIMENT

Figure 1:
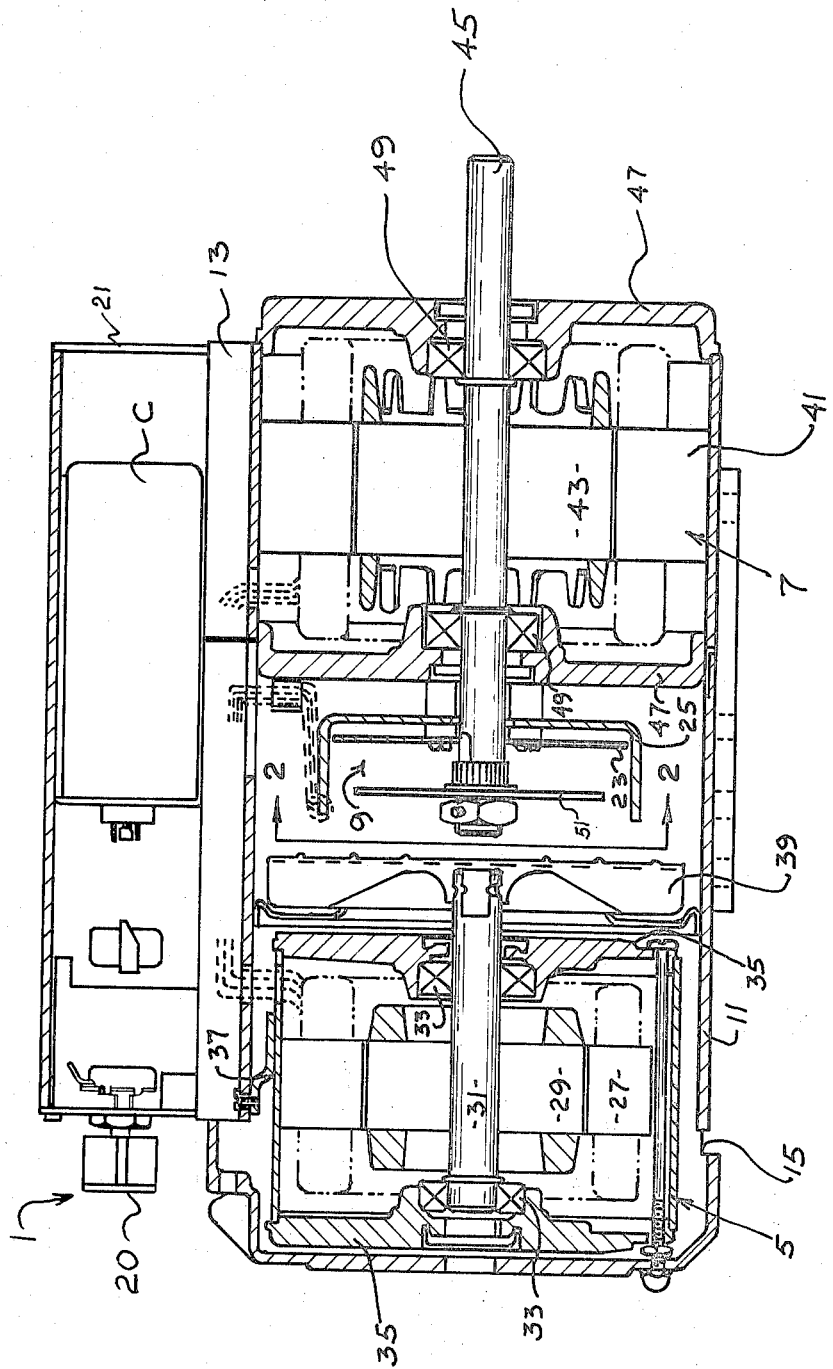
FIG. 1 is a view in axial cross section of the preferred embodiment of motor system of this invention, with some of the electronics removed for clarity.
Figure 2:
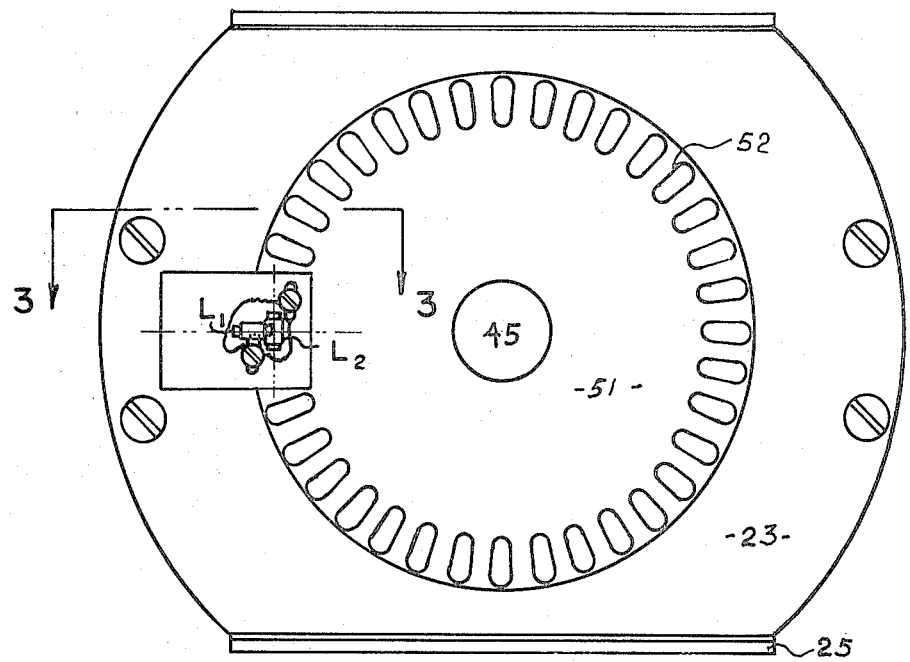
FIG. 2 is a detail of the motor system of FIG. 1, as indicated by arrows 2—2 of FIG. 1.
Figure 3:
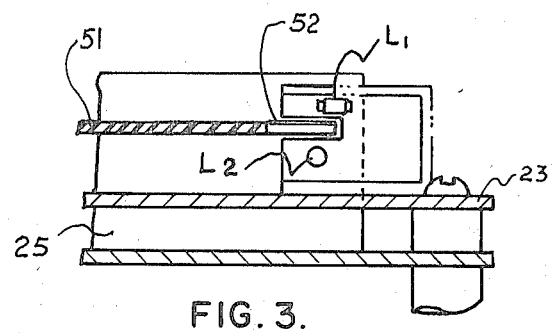
FIG. 3 is a sectional view taken along the line 3—3 of FIG. 2.

Referring now to the drawings, and in particular to FIGS. 1-9, reference numeral 1 represents one illustrative embodiment of motor system of the present invention. The motor system 1 is designed to operate from a standard 115 volt, 60 Hz, single phase power source shown at 3 on FIG. 4, and is rated at 1/2 horsepower. The unit 1 can operate continuously at 0-100 percent torque (nominally about 1.6 lb.-ft.) at any speed.

The motor system 1 includs a rotary phase converter 5, a two phase motor 7 and a speed control system 9. The phase converter 5 and two phase motor 7 are mounted coaxially in a common casing 11 which is provided with external fins 13 and a circumferential vent opening 15. All of the speed control 9 (except a manually operated speed-setting potentiometer 20 and a reversing switch 19, which are mounted on a control housing 21) are mounted on a circuit board 23 between the rotary phase converter 5 and the motor 7. A heavy aluminum sheet 25 acts as a shield and a heat sink for the circuit board 23.

Physically, the rotary phase converter 5 includes the usual stator 27, squirrel-cage rotor 29, rotor shaft 31, shaft bearings 33 and end shields 35. The bearings 33 are preferably ball bearings. The rotary phase converter 5 is spaced from the interior wall of the casing 11 by spacers 37.

The sole load carried by the phase converter shaft 31 is a fan 39 at the end of the shaft 31 adjacent the two phase motor 7. The fan 39 is proportioned to draw a large quantity of air across itself, the circuit board 23 and the motor 7.

The motor 7 also includes the usual stator 41, squirrel-cage rotor 43, rotor shaft 45, end shields 47 and shaft ball bearings 49. The stator 41 is held in tight, heat-transfer relationship to the casing 11. The outer end of the shaft 45 extends through the bearing 49 for attachment to a rotary device, and to the inner end of the shaft 45 is attached a tachometer disc 51, as explained more fully hereinafter.

Figure 4:
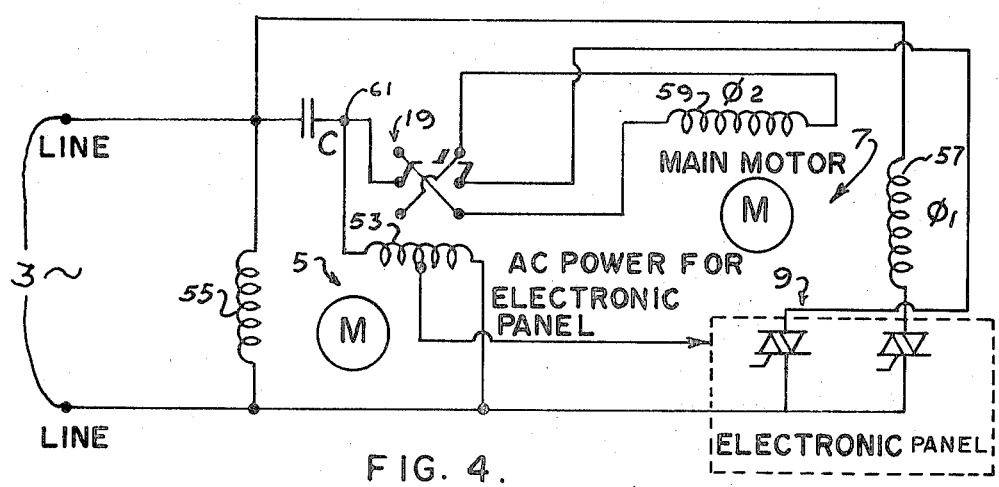
FIG. 4 is a schematic wiring diagram of the motor system of FIGS. 1-3.
Figure 5:
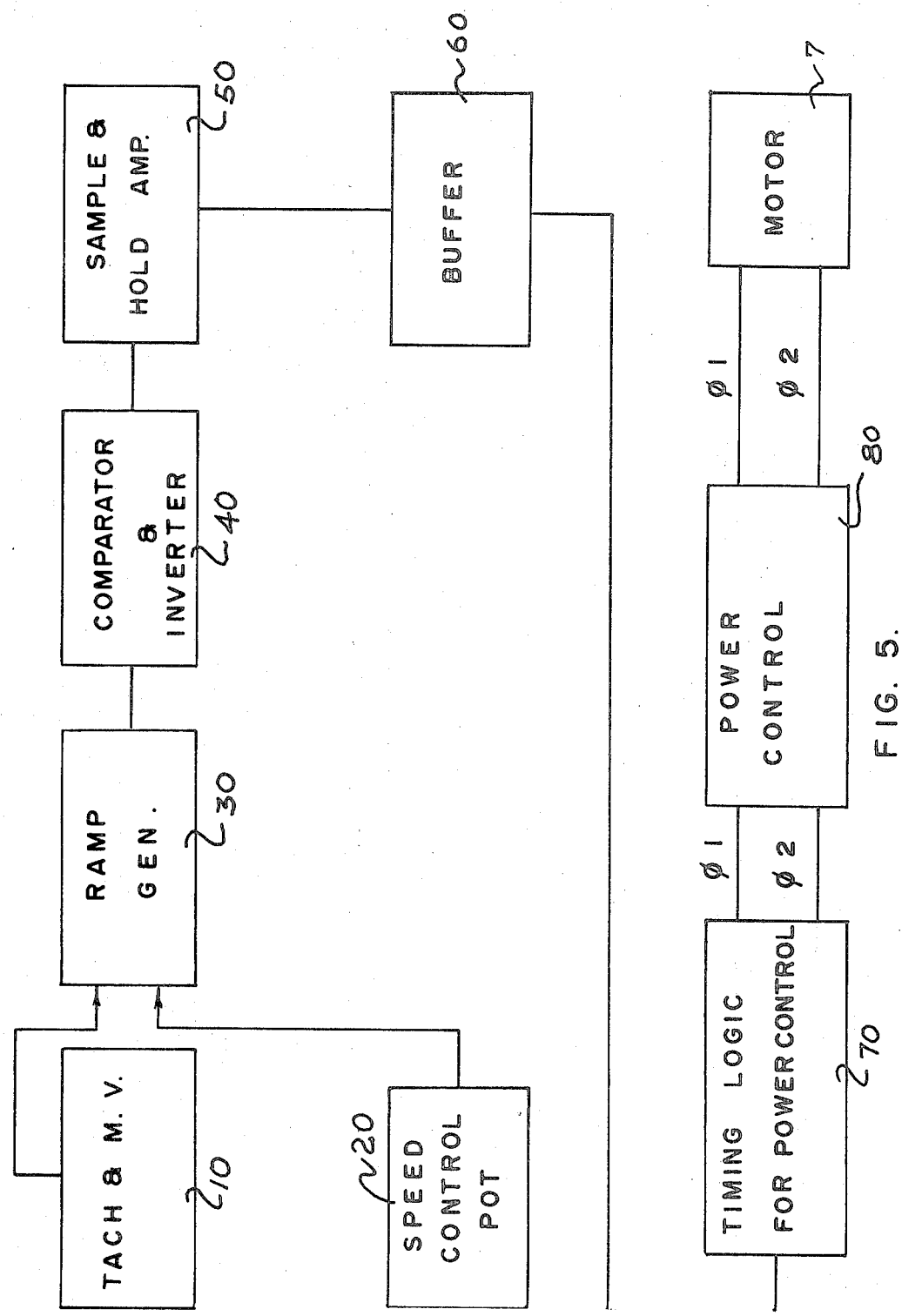
FIG. 5 is a schematic diagram of the motor control system utilized in the motor system of FIG. 1.
Figure 6:
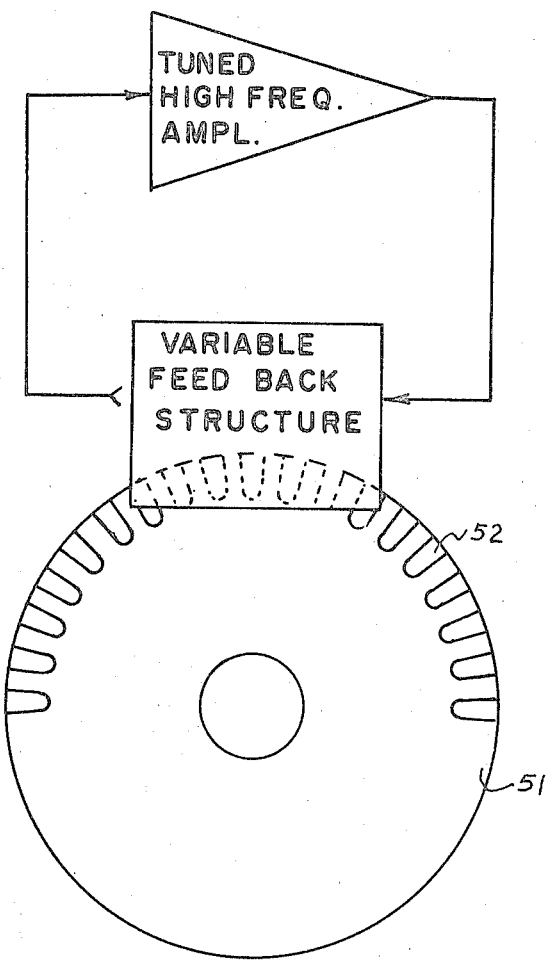
FIG. 6 is a diagrammatic representation of the speed sensing means (tachometer) of the motor system of FIG. 1.

As shown in FIG. 4, the phase converter 5 is wound as a single phase permanent split capacitor motor, and includes the usual capacitor C in the excitation circuit of its aux winding 53, to provide a phase shift between the aux winding 53 and the main winding 55. The aux winding 53 is center-tapped to provide a power source for the speed control 9.

The main drive motor 7 is a two phase motor having a "phase 1" winding 57 and a "phase 2" winding 59. The phase 1 winding 57 is connected directly across the power source 3, through the electronic control 9, and the phase 2 winding is connected between the output of the phase converter, shown at 61, and the common of the power source 3 through the reversing switch 19 and the electronic control 9.

The function of the rotary converter 5 is two-fold: to provide two phase power for operation of the main motor 7 and to provide cooling air for the system. Because of this need for cooling air and of the limited available diameter for the cooling blower, a two pole converter is used. Since one phase of the required two phase power is available from the incoming line, the converter needs only to supply the other phase, or "phase 2" power, 90° out of phase with the "phase 1" power. The phase 2 power generated by the converter is augmented by the permanently connected capacitor C. The capacitor C also improves the power factor of the system. For the capacitor C to operate effectively, an unbalanced phase voltage relationship is designed for. Phase 1 is the nominal 115V line and phase 2 is 295V (nominal at 100 percent load and 100 percent speed).

Since the rotary converter 5 has to supply roughly one half of the electrical power to operate the main motor 7 and also the mechanical power to cool the system, it is of a size comparable to a 1/3 h.p. motor. The lowest available rotor resistance is used, as this provides the most effective phase conversion. The stator design provides a minimum leakage reactance consistent with manufacturing considerations.

At rated (1/2 h.p.) speed and load on the main motor 7, the converter 5 (with the capacitor C) supplies 377 volt-amperes to the main motor phase 2 winding while the line supplies 394 volt-amperes. At 600 rpm and rated load, phase 1 volt-amperes is 690, and phase 2 volt-amperes is 480.

The main drive motor 7 is an unsymmetrical two phase unit. It takes its phase 1 power from the 115V line and its phase 2 power from the phase converter nominal output of 295V. The stator design is chosen according to conventional design criteria. A turns ratio (phase 2 to phase 1) of approximately 2.5:1 may be used. It will be seen that at any nominal phase 2 output voltage from the phase converter 5, the phase converter 5 and main motor 7 may have turns ratios which are about equal to each other. This motor is required to deliver rated torque at any speed, the electronics 9 supplying the needed current with a 100 percent duty rating. Since the motor is cooled with a constant supply of air, the torque rating is determined by the speed at which maximum winding temperature is achieved, when excited to produce that rated torque. The rotor characteristics of the motor 7 establish a compromise of heating at stall and rated torque balanced against the amount of slip at full excitation and rated torque.

It has been found that a very satisfactory comprise uses stall as the operating point for 100 percent duty at rated torque, and 1,600 r.p.m. as the speed for rated h.p. Torque rating is 26.3 oz. ft., producing 1/2 h.p. at 1,600 r.p.m. Phase 1 current at 26.3 oz. ft. and stall is 7.16 amperes, and phase 2 current for the same conditions is 1.37 amperes.

The reversing switch 19 is connected to reverse the terminals of the drive motor phase 2 winding 59. It will be seen that the system provides instantaneous reversal of rotation for the motor 7 and full torque in either direction of rotation. By the use of a symmetrical (nondirectional) speed control 9, full control and full torque may be achieved in either direction of shaft rotation.

The motor system as thus far described is capable of operation under very high starting loads, because of its high starting torque and its ability to run cool independent of the shaft speed of the main drive motor 7. Therefore the motor system 1, even without the electronic control 9, is highly advantageous in many applications.

It will immediately be apparent to those skilled in the art that numerous speed controls could be used to sense the shaft speed, compare it with a fixed or variable standard, and adjust the "on" time of the electronic control gates for both phase 1 and phase 2 to correct a deviation. A notable characteristic to be considered in the design of the control dynamics of this type of system is the speed of response and the very broad range of variation of that response. For example, the motor system described has a maximum excitation torque which is almost constant from stall to 1,000 r.p.m. and has a value of 48 oz. ft. With a rotor inertia of .17 pound ft.$^2$, the rotor can accelerate at about 87 r.p.m. per cycle of 60 cycle power. The same rotor may require several seconds to coast down through the same speed change. The motor, when connected to a load might see any value of added inertia. The capability of the motor to achieve a rapid speed change suggests the desirability of achieving 1/2 cycle control response. An objective of the design of the preferred control 9 was to provide a uniform speed droop of 50 r.p.m. from no load to rated load over the entire control range. Noting that the motor can accelerate by an amount greater than this in one cycle emphasizes the need for fast response of the electronics and sensor.

Figure 7:
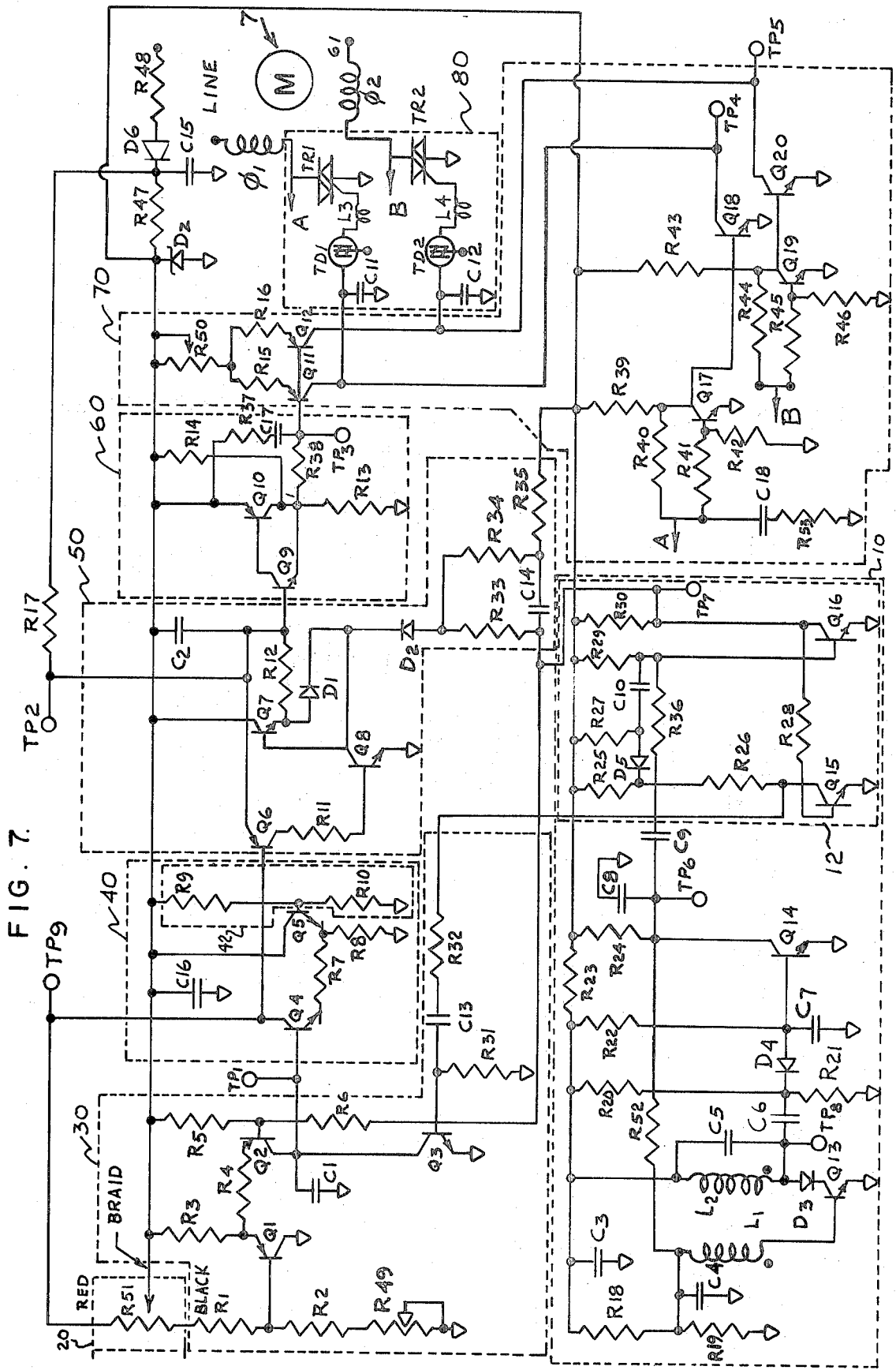
FIG. 7 is a detailed circuit diagram of the speed sensing means and control circuit of the motor system of FIG. 1.

The preferred control 9 achieves nearly the desired response over a very large speed range. The control 9 is shown diagrammatically in FIG. 5, and the detailed circuitry of the preferred control 9 is shown in FIG. 7. Likewise, the preferred speed sensor 10 is shown diagrammatically in FIG. 6 and its construction is shown in some detail in FIGS. 2 and 3.

As shown in FIGS. 4 and 7, the control circuit 9 derives its power from the center tap of the phase converter aux winding 53 through a standard voltage regulating rectifier composed of resistor R 48, diode D 6, capacitor C 15, resistor R 47, zener diode D Z, and capacitor C 16. The control circuit 9 is also connected to the energizing circuits of the windings 57 and 59 of the main motor 7 as shown at A and B respectively in FIG. 7.

Figure 8:
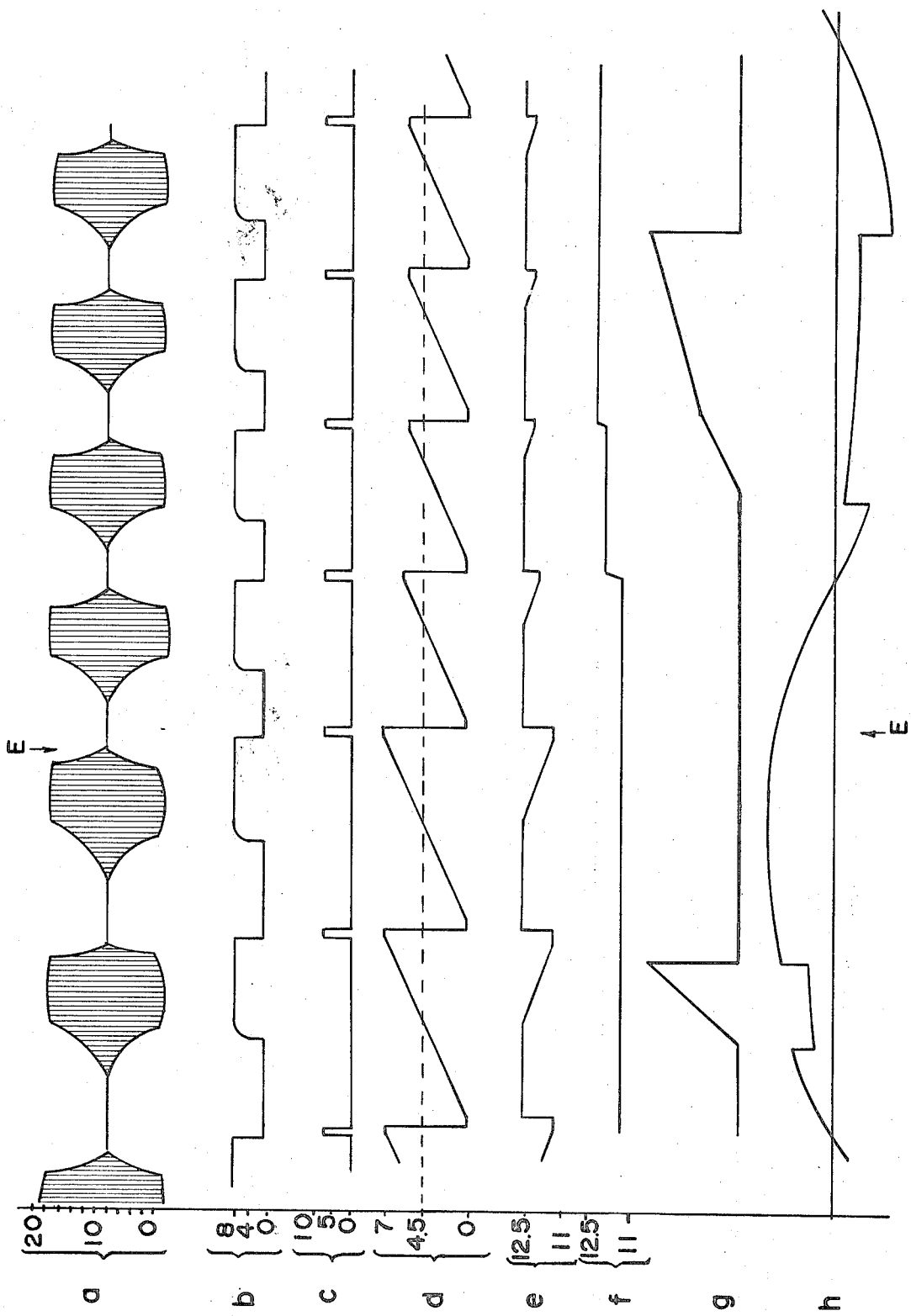
FIG. 8 is a diagrammatic representation of the timing of signals in the control circuit of FIG. 7.

The basic organization of the preferred speed control circuit 9 includes a digital tachometer 10 which produces a train of pulses having a frequency which is dependent on the speed of the motor 7. The control circuit compares the sensed speed with the setting of the manual speed control potentiometer 20 and produces an error signal, in the form of a voltage level, to a timing logic circuit 70 for controlling the firing angle of the power control 80 gating devices. The error signal is generated in a manner best seen by reference to FIGS. 5 and 8. In FIG. 8, the signals within the preferred control circuit 9 are shown as the motor speeds up momentarily in response to the sudden decrease of a load. This increase in speed is highly exaggerated for the sake of clarity. The tachometer 10 produces a burst or envelope of r.f. oscillation, as shown in FIG. 8a, for each 10° of revolution of the motor shaft. The end of each envelope is sensed, as shown in FIG. 8b, and converted by the multivibrator to a pulse of a fixed width and amplitude, as shown in FIG. 8c. The ramp generator 30 produces a ramp having a slope dependent on the setting of the speed control potentiometer 20. The ramp is terminated in a plateau (having a width equal to the width of the multivibrator pulse) by the multivibrator pulse. This wave form is shown in FIG. 8d. The height of the plateau is therefore a function of the speed control setting and an inverse function of the sensed speed. This plateau is compared with a fixed reference and inverted by the comparator and inverter 40, as shown in FIG. 8e, and the voltage of each inverted plateau is held by a sample and hold amplifier 50 and buffer 60 for insertion as an error signal into the timing logic circuit 70, as shown in FIG. 8f. The timing logic circuit 70 includes a zero-crossing detector and a ramp generator for producing a triac triggering voltage ramp having a slope dependent on the magnitude of the error signal. This ramp is shown in FIG. 8g for the phase 1 half of the timing logic circuit 70. The system quickly finds a point of stability (for any load and speed setting) at which the error signal produces a firing angle which maintains a constant motor speed, without hunting. The voltage across the phase 1 triac is shown in FIG. 8h.

In FIG. 8 the motor system is running at a speed of 600 r.p.m. under an overload condition, when, at the point marked "E," a large part of the motor load is removed and the motor begins to accelerate rapidly, powered by the half wave of excitation shown at the left of voltage curve 8h. The acceleration and rate of acceleration as previously mentioned, are exaggerated beyond those which would normally be caused by the removal of a load (it will be recalled that the maximum acceleration of the unloaded rotor is on the order of 90 r.p.m. per cycle). The simulated acceleration shown, however, clarifies the operation of the control system in response to a change in speed and indicates the expected response of the system if these extreme conditions were imposed upon it.

The response of the system is immediate, as shown in FIG. 8. As shown in FIGS. 8a–g, as the tachometer pulse repetition rate increases, the length (hence the height) of the ramps (8d) decreases for each pulse. Therefore, the magnitude of the error signal is reduced substantially instantaneously, and the slopes of the firing circuit ramps are reduced substantially instantaneously for any ramp which is being generated when the acceleration begins. Therefore, the system response time is generally less than a half cycle of the excitation power.

To achieve extremely fast response, the speed sensor (electronic tachometer) 10 includes a 36 segment disc 51, and the electronics panel is designed to make a complete new speed reading for each segment on the disc. The four pole motor used, with its synchronous speed of 30 rps, then provides speed information at a rate of 30 × 36 = 1,080 samples per second at synchronous speed. At 1/10 that speed the sample rate is 108 per second.

The disc 51 carried by the motor shaft 45 is a printed circuit board etch processed in a normal manner. The pattern etched on the board is simply a series of uniformly spaced conducting segments 52 around the periphery of the disc. In operation, as the disc 51 rotates the conducting segments 52 pass through the field created by a radio frequency oscillator circuit. The coil geometry of the oscillator is designed to have an axis of symmetry such that if a segment (which acts as a shorted turn) on the disc is on one side of the axis, the oscillation circuit oscillates in a normal manner. If that segment is moved to the other side of the axis however, the oscillator circuit stops oscillating. Thus, as the disc rotates a burst of r.f. oscillation occurs for each segment on the disc. This r.f. oscillation occurs at high level and is readily converted to a series of pulses (one pulse for each burst) to operate the electronic speed control circuitry.

The speed sensor 10 oscillator is composed of transistor Q13, coils L1 and L2 and related parts. The coils L1 and L2 are wound on small ferrite rods. Coil L2 and capacitor C5 form the resonant circuit for the oscillator and operate at about one megacycle. Coil L2, in the collector circuit of transistor Q13, acts as the primary of the inductive oscillator coupling circuit. Coil L2 is mounted so that its axis is normal to, and centered on, a radial line from the motor shaft 45. The oscillator feedback coil L1 is mounted along a parallel radial line, the two parallel radial lines being spaced apart axially enough that the rotor disc can pass between the two coils. The inboard end of the coil L1 ferrite rod is the same radial distance from the motor axis as is the center of the coil L2 ferrite rod. Design of the tachometer disc is such that the area center of the conducting segments is at about that same radius. The coil geometry described puts the feedback coil L1 at approximately an electromagnetic null with the primary coil L2. The presence of a conducting segment on the tachometer disc disturbs that null to achieve a feedback coupling around transistor Q13. As a conducting segment passes through the axis of symmetry, the null is momentarily restored and then the polarity of the feedback reverses. For one polarity transistor Q13 is operating with negative feedback and the design is such that the circuit is quiescent. For the other polarity the feedback is positive and the circuit oscillates at the frequency determined by coil L2 and capacitor C5. Therefore, as the tachometer disc 51 spins, a burst or envelope of r.f. oscillation is generated for each segment on the tachometer disc. This pulsating r.f. signal is shown diagrammatically in FIG. 8a, taken at test point (T.P.) 8.

Oscillation output is detected and buffered by transistor Q14 and related parts. With no oscillation, the current through resistor R22 turns on transistor Q14 and the voltage across capacitor C8 is small. When the oscillator comes on, the r.f. is coupled through capacitor C6, rectified by diode D4 to charge capacitor C7 negatively, and thus turn off transistor Q14. With transistor Q14 off capacitor C8 charges to power supply voltage. Resistor R52 provides a small latch-up feedback to the oscillator bias circuit; this feedback stabilizes the transition from on to off and from off to on of the oscillator. The two transistors Q13 and Q14 with related components comprise the complete electronic tachometer circuit. Output is the voltage across capacitor C8 and is measurable at test point (T.P.) 6, as shown in FIG. 8b.

Transistors Q15 and Q16 and related parts constitute a delay multivibrator 12. The delay is initiated by the trailing edge (negative going transition) of the tachometer signal. Operation is as follows: A bias current through resistor R29 turns on transistor Q16 to saturation and maintains the circuit in a quiescent state. This state is maintained until the trailing edge transition occurs. At this time, as transistor Q14 turns full on, resistor R29 bias current is momentarily absorbed in charging capacitor C9 through resistor R36. As transistor Q16 turns off, transistor Q15 is turned on by current through resistor R30 and resistor R28. As transistor Q15 turns on, a negative signal is regeneratively applied to the base of transistor Q16. The circuit holds itself in that state as long as the charge on capacitor C10 is such that transistor Q16 is off. The current through resistor R29 discharges capacitor C10 and after a certain discharging time delay period transistor Q16 begins to conduct again. A regenerative reduction in the base current of transistor Q15 occurs and the circuit triggers back to its stable state. This transition is allowed to occur at high speed by the inclusion of diode D5. As transistor Q15 turns off, diode D5 becomes reverse biased and allows the current in resistor R26 and resistor R25 to fall quickly to zero. Recharging of capacitor C10 is done at a slower rate by current through resistor R27.

When the delay multivibrator 12 is triggered to the unstable state as described, the attenuation provided by resistor R25 and resistor R26 prevents the peak negative signal on the base of transistor Q16 from exceeding the five volt limitation beyond which an avalanche condition might occur.

The negative transition of the tachometer signal functioning as described to trigger the delay multivibrator reflects the end of the burst of r.f. oscillation. The triggering of the circuit in this manner was chosen for an important reason related to noise sensitivity. When the oscillator transistor Q13 is quiescent it is actually a tuned r.f. amplifier and ampifies any electrical noise picked up by the circuit, particularly by coil L1. As the feedback due to the tachometer disc starts to become positive this r.f. amplifier becomes regenerative and its gain becomes increasingly high. In this state, a noise pulse can trigger the circuit into oscillation prematurely and thereby signal an incorrect value of rotational speed of the disc. On the other hand, when the circuit is already oscillating the effect of noise signals is relatively much smaller in affecting the instant at which oscillation stops. The trailing edge of the tachometer signal is thereby a more true representation of the movement of the tachometer disc and hence is used as the basis for controlling the signal processing.

The delay multivibrator 12, as described, produces output pulses of fixed duration (85 microseconds) and operates once for each burst of R.F. oscillation. The output pulses, measured at T.P. 7, are shown in FIG. 8c. These output pulses control, or program the rest of the signal processing circuitry.

Transistors Q1 and Q2 and related parts make up a temperature compensated current source 30 which is responsive to the setting of potentiometer R51 of the manually operated speed control 20 to generate a ramp voltage across capacitor C1. More specifically, these circuit elements provide a current which is proportional to the unbalance of a bridge circuit which has a fixed leg and an adjustable leg. The fixed leg is composed of resistor R5, resistor R6, and emitter-collector voltage of transistor Q16. Transistor Q16 is normally saturated; however, its contribution to the fixed leg of the bridge amounts to a small ohmic addition to resistor R6. The adjustable leg of the bridge is made up of part of potentiometer R51, resistor R1, resistor R2 and resistor R49. Output from this current generator in operation is the voltage unbalance of these two bridge legs divided by resistor R4. When the speed control is set to zero speed, all of potentiometer R51 is in the bridge circuit and the current through resistor R4 is at a minimum value. When potentiometer R51 is at a setting of any given amount greater than zero speed, the current through resistor R4 may be adjusted by trim adjust resistor R49. At maximum speed, potentiometer R51 is out of the circuit and current flow is maximum.

Output current of the source 30 is from the collector of transistor Q2. When the multivibrator 12 is quiescent this current charges capacitor C1 to produce a ramp. When the multivibrator 12 is in its unstable state, transistor Q16 is off, turning off the current source. In this condition the charge on capacitor C1 is held at a plateau.

During and immediately following the transition of multivibrator 12 from the unstable state to the stable state a positive pulse of current is coupled through capacitor C13 and resistor R32 to the base of transistor Q3, turning it on. Design of the circuit is such that capacitor C1 is completely discharged during the 80 microseconds of this conduction of transistor Q3. Thus the voltage on capacitor C1 is a ramp starting at zero, increasing with a slope determined by the speed command, and reaching a plateau at a time determined by motor speed, holding at that plateau a fixed time, (85 microseconds), and then returning to zero to start over. This voltage is the output of the ramp generator 30 and is shown in FIG. 8d, as measured at T.P. 1.

The voltage level of the plateau, relative to a reference value, is an inverse measure of the difference (or error) between commanded motor speed and achieved speed. If for example the achieved speed is too low the charging time (length of the ramp) is long and the plateau is high. If the speed command setting is changed to double the current, the height of the plateau is returned to an original value if the speed of the motor is also doubled.

The ramp voltage generated by the circuit 30 is applied to the base of transistor Q4 of a temperature stable, variable gain level comparator and inverter circuit 40. Output of the comparator 40 is the collector voltage of transistor Q4. The comparator circuit 40 also includes transistor Q5 and resistors R7, R8, R9 and R10. Resistors R9 and R10 comprise a voltage divider 42 which provides a constant potential on the base of transistor Q5. This potential is the reference level for the comparator 40. The collector of transistor Q5 is connected to the power supply voltage (Vc). The emitter of transistor Q5 is connected to the emitter of transistor Q4 through resistor R7, and to ground through resistor R8. It will be seen that as the ramp voltage applied to the base of transistor Q4 exceeds the comparator reference voltage, transistor Q4 begins to conduct, thereby producing an inverted ramp signal output. This signal, being a reflection of the plateau and the tail end of the ramp, is in the form of a train of pulses, which are applied to the base of transistor Q6. Output of the comparator 40 is the speed error, amplified (with a variable gain as explained hereinafter), inverted and referenced to the power supply voltage (Vc). FIG. 8e shows the comparator 40 output, as measured at T. P. 9.

The need for the variable gain of the comparator circuit 40 is created because change in the error signal with deviations from the set speed is a function only of the ratio of actual speed to set speed. Therefore, generally speaking, the system wants to maintain the same percentage droop in speed at a slow operating speed as it does at a high operating speed. In other words the sensitivity, in terms of actual r.p.m., to speed change becomes greater as the operating speed is reduced. This is impractical. To remedy this problem, the electrical gain is made proportional to set system speed. With this proportionality, the speed droop in r.p.m. from no load to full load is substantially constant over the entire speed range.

This electrical gain variation is accomplished in a simple and effective way with the speed control potentiometer R51. The wiper-to clockwise terminal resistance of this potentiometer at a particular setting determines the speed command whereas the wiper-to counterclockwise terminal is the collector resistance of the differential comparator stage. The voltage gain of this stage is approximately the collector resistance divided by resistor R7. At maximum speed command this gain is a maximum (about −1.6x). This gain diminishes approximately linearly as the speed command is decreased. The zero speed intercept of this gain change is adjustable with trim adjustment resistor R49, as described hereinafter.

The differential comparator 40 has a definite maximum current output, based on its design. This maximum, in harmony with the variable transistor Q4 collector resistance, allows the comparator output to become saturation signal limited at very low speed settings. Inasmuch as the torque generated by the motor is controlled by speed error this saturation limits the torque which can be delivered at very low speed command settings. This limitation is progressively lower as the speed setting is made lower. In the limit, with the speed command potentiometer resistor at its counterclockwise end, the collector resistance is zero, there is zero error signal and the system is off.

Transistors Q6, Q7, Q8 and related parts make up a sample and hold circuit 50. Sample and hold circuit 50 produces a ripple free d.c. output at a voltage dependent on the height of the inverted plateaus applied to it from the comparator circuit 40. The voltage level of the output follows the level of the individual plateaus of the input train with a speed of response approximately equal to the theoretical maximum. Input is the pulse train applied to the base of transistor Q6 and output is the charge on capacitor C2, which is equal to the input voltage of the last applied plateau, displaced by the .6v base to emitter junction voltage of transistor Q6. The sample and hold circuit 50 has an output which is temperature responsive in a manner to compensate for the temperature response of following circuitry so that the overall circuit is temperature stable.

The charge on capacitor C2 is responsive to the level of an inverted plateau in the following manner. During a plateau the delay multivibrator 12 is in its unstable state and the collector voltage of transistor Q16 is high. The network consisting of resistor R33, capacitor C14, resistor R34 and resistor R25 provides a forward bias current through diode D2 during the plateau (or sample) period. This bias current turns on the sample and hold amplifier. Capacitor C14, resistor R34, and resistor R35 act as a level shift circuit and are needed to turn on the sample and hold amplifier when the charge on capacitor C2 is small. When turned on, the sample and hold amplifier acts as a unity gain circuit with a d.c. offset determined by the base to emitter voltage of transistor Q6.

During a sample which represents no change from the previous sample, the turn on current through diode D2 divides, with most of the current going to the collector of transistor Q8 and just enough bias on transistor Q7 that its emitter current (through resistor R12, transistor Q6 and resistor R11) turns on transistor Q8 as needed to absorb the main part of the turn-on current. In this way there is no change on the charge on capacitor C2, as measured at T.P. 2 and shown in the left-hand half of FIG. 8f.

For a sample period which reflects an increase in speed of the motor, the period of the tachometer signal is shorter and the plateau thereby is lower. The signal at the base of transistor Q6 at the start of the sample time then is higher (closer to Vc) than it was for the previous sample. This unbalance produces a decrease in current through transistor Q6 and thereby an amplified increase in the emitter current of transistor Q7. This amplified current changes the charge on capacitor C2. During the time of the sample turn on pulse, the charge flow into capacitor C2 continues in an asymptotically diminishing manner until the current equality between transistor Q6 emitter and transistor Q7 emitter is restored. This change in charge is shown in the right-hand half of FIG. 8f.

Conversely, for a sample period which reflects a decrease in speed, a correction is made in the charge on capacitor C2, but the action is different. The charge correction begins as soon as the (longer) ramp goes through the value of the previous plateau. At this point, transistor Q6 starts to conduct and in turn transistor Q8 conducts in an amplified manner. The collector current of transistor Q8 flows through diode D1 and resistor R12, adding to the emitter current of transistor Q6 to take charge out of capacitor C2. The transistor pair Q6 and Q8 then act as a high current sensitivity emitter follower and the voltage on T.P. 2 follows the inverted ramp as applied to the base of transistor Q6, offset by the base-emitter voltage of transistor Q6. When the plateau is reached and the sample and hold turn-on current flows through diode D2, the correct new voltage is already stored on capacitor C2.

This shortened response time to a low speed condition, while of value when the motor is running, is vital if the motor is at stall. The reason for this importance of course is that at stall time between samples is infinite. The circuit design described allows a smooth transition from not turning to turning.

The voltage across capacitor C2 is the generated error signal and is equal to the actual speed error multiplied by the variable gain factor of the comparator 40.

When the speed command potentiometer, starting at zero, is gradually rotated clockwise the error signal increases gradually as the potentiometer is rotated. This feature, together with the zero speed operation of the sample and hold amplifier, allows the motor to be started gradually, under the full command of the operator.

A further feature of the sample and hold amplifier relates to the possibility that an operator might attempt to start the system but for some reason want to back off before rotation has begun. To accomodate this possibility and also to prevent a zero speed setting creep of the motor, a continuous turn off bias is supplied through resistor R17.

The system error signal, as developed at T.P. 2 is used to control the torque developed by the motor. Since this voltage is maintained between speed samples as the charge on capacitor C2, a buffer amplifier 60 with low input current is required in order to avoid depleting or changing the charge on capacitor C2 between samples. This is done with the low input current emitter follower made up of transistors Q9 and Q10. This unity gain emitter follower works in a manner similar to the one made up of transistors Q6 and Q8 as previously described, but has a voltage offset of the opposite polarity and includes a maximum signal limit. The temperature coefficient of this circuit is of the same magnitude (2 mv per degree, C.) as the sample and hold amplifier 50, but of the opposite polarity. In this way the nominal overall temperature coefficient of the control to this point is zero.

When the charge on capacitor C2 is small, transistors Q9 and Q10 operate to deliver a current to resistor R13 to make its voltage rise follow the voltage at T.P. 2, offset by the base-emitter voltage of transistor Q9. As the charge on capacitor C2 increases an increasing part of the current through resistor R13 flows through resistor R14. For a continuing increase of charge when the voltage at transistor Q9 emitter drops to about 10 volts essentially all of the resistors R13 current goes through resistor R14. Transistors Q9 and Q10 turn off and any further increase in system error (charge on capacitor C2) does not reflect any further change in the transistor Q9 emitter voltage. The transistor Q9 emitter voltage is substantially equal to the T.P. 3 voltage since resistor R38 is a low value, providing transient current limiting. Resistor R37 and capacitor C17 form a nonsymmetrical filter, which improves the stability margin of the system. This filter limits the magnitude of acceleration rate which can be signaled to the motor but does not so limit the deceleration rate. During deceleration the buffer is actively "pulling up" T.P. 3 and the impedance driving T.P. 3 is substantially equal to the value of resistor R38, which is 100 ohms. During large signal acceleration, the transistors Q9 and Q10 turn off and the impedance is resistor R38 plus resistor R14 and resistor R13 in parallel. This amounts to about 16,000 ohms. Thus the large signal time constant of the filter is much greater for acceleration than it is for deceleration.

The voltage at T.P. 3 drives two identical current sources which control the firing of two output triacs. Transistor Q11 (with resistor R15) controls the main phase triac. Its collector current charges capacitor C11, producing a ramp, except as modified by the trigger device TD1 and its associated inductor L3 or by the zero crossing detector comprising transistors Q17 and Q18 and resistors R39, R40, R41 and R42. The zero crossing detector is responsive to the voltage across its related triac. When the voltage across the main triac is nearly zero, the current through resistor R40 and through resistor R41 is low, transistor Q17 is off, current through resistor R39 turns on transistor Q18, and the charge on capacitor C11 is reduced to zero and held there. When the voltage on the main triac swings substantially negative the bias current through resistor R39 flows through resistor R40 and transistor Q18 turns off. When the voltage swing is positive, current through resistor R41 turns on transistor Q17 which again turns off transistor Q18. When transistor Q18 turns off the transistor Q11 current starts the ramp, which increases from zero as capacitor C11 accumulates charge. This continues either until the trigger turns on, or until the next zero crossing, at which time transistor Q18 again turns on to reset the ramp back to zero.

The trigger device TD1 is a silicon bilateral switch (S.B.S.) which turns on at about 8 volts. When on, the voltage drop across the S.B.S. is about that of a forward biased diode. If the S.B.S. is not triggered by the ramp, the triac is not fired and the phase is off; the signal at T.P. 4 is then a sawtooth wave repeating twice per power line cycle (120 cps), with an amplitude of less than 8 volts. At higher amplitudes, the S.B.S. triggers, discharging capacitor C11 into the main triac gate and firing the triac. The zero crossing detector functions to turn on transistor Q18, holding T.P. 4 at zero until the triac commutates off. Capacitor C18 and resistor R53 assure commutation under all load conditions. When the triac commutates off, a new ramp starts, to time the next 1/2 cycle of the triac firing. This type of timing is quite precise, assures smooth control of the phase during the transition from off to on, and also provides accurately equal half cycles of current flow in the triac.

The other firing circuit, consisting of resistor R16, transistor Q12, capacitor C12, trigger device TD2, coil L4, transistors Q19 and Q20, and resistors R43, R44, R45 and R46 works identically. Its zero crossing detector is responsive to the system phase 2 (aux-phase) which leads the phase 1 (main phase) by 90 electrical degrees.

The amount of current delivered depends on the magnitude of the system error signal and can be modified by adjustment of resistor R50, which serves as a main sensitivity control for the system.

In addition to the main sensitivity adjustment R50, low speed adjustment is provided by means of variable resistor R49. This adjustment is used to establish the proper intercept of potentiometer R51 potentiometer setting versus the no load speed. An adjustment procedure which works satisfactorily is to adjust potentiometer R51 to produce a specified value of locked rotor torque, typically the rated torque. At that R51 setting, resistor R49 is then adjusted to get a specified value of no load speed, typically 200 r.p.m. This setting then establishes the minimum set value of no load speed at which 100 percent torque can be delivered. The proper setting of resistor R49 assures charging of capacitor C1 even at the zero speed setting of potentiometer R51, and thus assures smooth turn on and jogging of the motor.

Merely by way of illustration, the electronic components of the preferred control circuit 9 may have the following values, or be obtained from the following standard sources:

| | | | |
|---|---|---|---|
| R1 | 1.8K ohms | R28 | 68K ohms |
| R2 | 22K ohms | R29 | 68K ohms |
| R3 | 390 ohms | R30 | 4.7K ohms |
| R4 | 820 ohms | R31 | 1K ohms |
| R5 | 2.2K ohms | R32 | 1K ohms |
| R6 | 10K ohms | R33 | 22K ohms |
| R7 | 3.3K ohms | R34 | 22K ohms |
| R8 | 2.2K ohms | R35 | 27K ohms |
| R9 | 8.2K ohms | R36 | 10K ohms |
| R10 | 4.7K ohms | R37 | 100 ohms |
| R11 | 0 ohms | R38 | 100 ohms |
| R12 | 47 ohms | R39 | 47K ohms |
| R13 | 56K ohms | R40 | 150K ohms |
| R14 | 22K ohms | R41 | 150K ohms |
| R15 | 820 ohms | R42 | 27K ohms |
| R16 | 820 ohms | R43 | 47K ohms |
| R17 | 1 megohms | R44 | 220K ohms |
| R18 | 47K ohms | R45 | 220K ohms |
| R19 | 4.7K ohms | R46 | 27K ohms |
| R20 | 22K ohms | R47 | 470 ohms |
| R21 | 10K ohms | R48 | 2K ohms |
| R22 | 100K ohms | R49 | 10K ohms |
| R23 | 2.2K ohms | R50 | 1K ohms |
| R24 | 10K ohms | R51 | 5K ohms |
| R25 | 1.5K ohms | R52 | 470K ohms |
| R26 | 2.2K ohms | R53 | 180 ohms |
| R27 | 100K ohms | | |

| | |
|---|---|
| C1 | 0.15 microfarad, 100 volts |
| C2 | 0.5 microfarad, 50 volts |
| C3 | 0.05 microfarad, 20 volts |
| C4 | 0.001 microfarad, 1K volts |
| C5 | 150 picofarad, 1K volts |
| C6 | 100 picofarad, 1K volts |
| C7 | 0.0025 microfarad, 1K volts |
| C8 | 0.001 microfarad, 1K volts |
| C9 | 0.001 microfarad, 1K volts |
| C10 | 0.005 microfarad, 1K volts |
| C11 | 0.1 microfarad, 100 volts |
| C12 | 0.1 microfarad, 100 volts |
| C13 | 0.01 microfarad, 50 volts |
| C14 | 0.05 microfarad, 20 volts |
| C15 | 150 microfarad, 35 volts |
| C16 | 10 microfarad, 35 volts |
| C17 | 100 microfarad, 10 volts |
| C18 | 0.022 microfarad, 600 volts |

| | | | |
|---|---|---|---|
| D1 | 1N 4148 | D5 | 1N 4148 |
| D2 | 1N 4148 | D6 | 1N 5060 |
| D3 | 1N 4148 | DZ | 1N 964A (0.4w, 13v.) |
| D4 | 1N 4148 | | |

| | | | |
|---|---|---|---|
| L1 | 150 microhenry | L3 | 3 microhenry |
| L2 | 150 microhenry | L4 | 3 microhenry |

| | | | |
|---|---|---|---|
| Q1 | (PNP) 2N6076 | Q12 | (PNP) 2N6076 |
| Q2 | (PNP) 2N6076 | Q17 | (NPN) 2N5172 |
| Q6 | (PNP) 2N6076 | Q18 | (NPN) 2N5172 |
| Q10 | (PNP) 2N6076 | Q19 | (NPN) 2N5172 |
| Q11 | (PNP) 2N6076 | Q20 | (NPN) 2N5172 |

Transistors Q3, Q4, Q5, Q15 and Q16 may be contained in a first transistor array CA 3086 (RCA); transistors Q7, Q8, Q9, Q13 and Q14 may be in an identical integrated circuit. Emitters of transistors Q15 and Q16 and of transistors Q13 and Q14 may be connected to the common emitter terminals of their respective arrays, and emitters of transistors Q3 and Q8 may be connected to the substrate terminals.

| | | |
|---|---|---|
| TD1 | 2N4991 | Motorola |
| TD2 | 2N4991 | Motorola |
| Triac 1 | 2N5573 | RCA (15 amp, 200 v) |
| Triac 2 | 40669 | RCA (6 amp, 600v) |

Capacitor C may be oil filled, 20 mfd, 370 vac.

Figure 9:
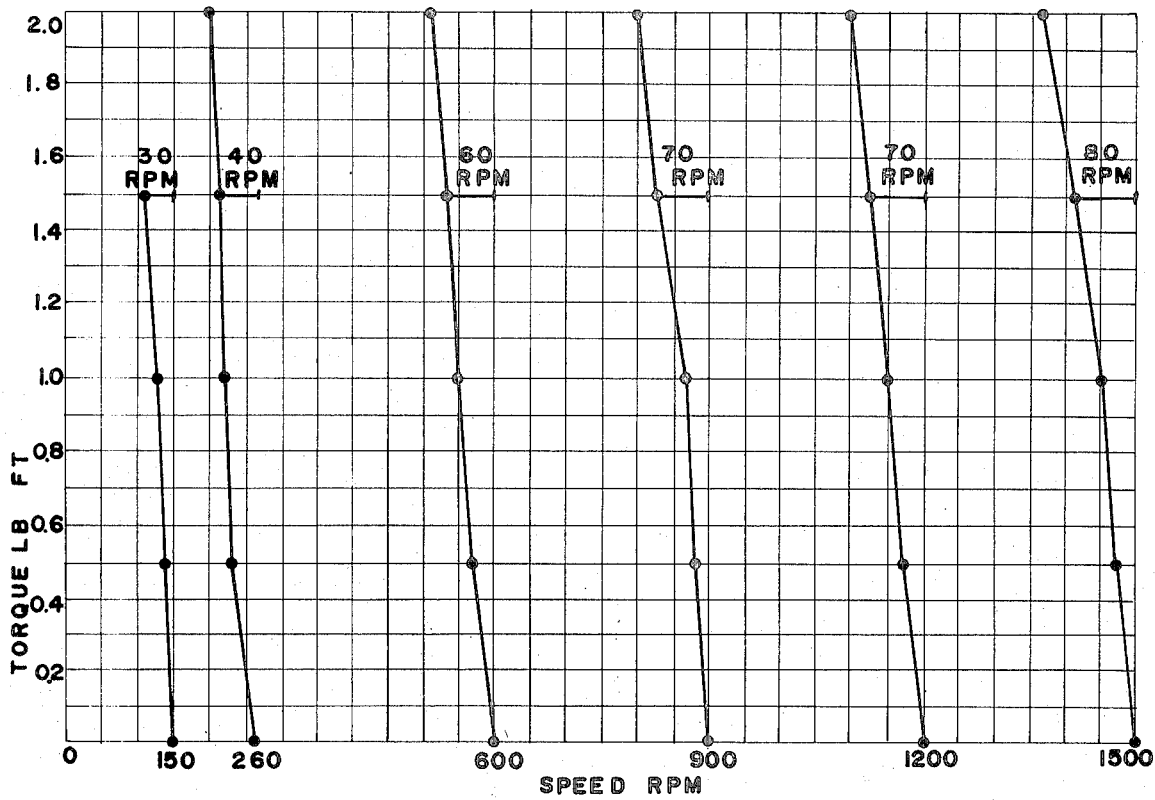
FIG. 9 is a graph showing the speed/torque characteristics of the motor system of FIGS. 1-8.

FIG. 9 shows the speed/torque curves of the preferred motor system 1, as illustrated in FIGS. 1–8 and described above. It will be seen that full torque is provided over a speed range of 10:1. Furthermore, the motor speed may be controlled over a complete speed range from substantially synchronous speed to stall. The fan 39 permits the motor to operate even under overload conditions and at extremely low speeds. The speed droop of the system is not precisely constant over its entire speed range, but is closely enough controlled for most applications.

The preferred embodiments of motor system, speed sensing means, and control system of this invention illustrated in FIGS. 1–9 are particularly advantageous in attaining the various objects of the invention, and provide a unit which is mechanically simple, rapid in its response to variations in speed, and controllable over virtually the entire theoretically possible speed range. However, numerous variations in the system, tachometer and control, within the scope of the appended claims, will be apparent to those skilled in the art.

Figure 10:
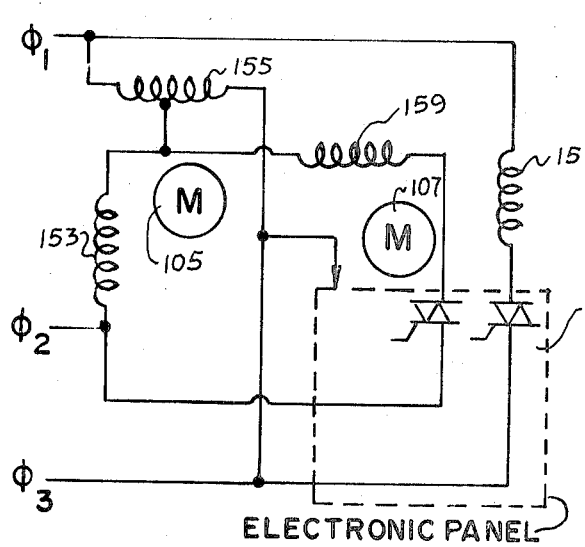
FIG. 10 is a schematic wiring diagram of a three-phase powered motor system analogous to the system of FIG. 4.

For example, the preferred single phase motor system may be adapted for use with a three phase power source as shown in FIG. 10. In this embodiment, the rotary phase converter 5 is eliminated and replaced by a two phase motor 105 having a first winding 155 and a second winding 153. The first winding 155 is electrically connected between a first and third phase of the power source, and the second winding 153 is electrically connected between a center tap on the first winding 155 and the second phase of the power source. Thus, it will be seen that the motor windings 155 and 153 are electrically connected as a Scott ("T") connection which converts three phase power to nearly balanced two phase power. Therefore, although rotation of the rotor of the induction motor 105 tends to equalize any phase unbalance in the three phase power source, its primary function is to run a cooling fan (not shown in FIG. 10).

The output motor 107 includes a "phase 1" winding 157 connected between the first and third phases of the three phase power source, electrically in parallel with winding 155, and a "phase 2" winding 159 connected electrically in parallel with winding 153 between a center tap of winding 155 and the second phase line of the three phase power source. Because the Scott connection provides a two phase power having a slight voltage unbalance (the "phase 1" voltage across the winding 155 being greater by a factor of about 1.15), a turns ratio (phase two to phase one) of approximately 1:1.15 may be used.

The "electronic panel" 109 differs from the control circuit 9 only in that its rectifier power supply is designed to handle a supply voltage from the excitation fircuit of the winding 155, and in that the circuit 109 is isolated from the gating means (triacs) by a transformer connection to the triac gates. Such isolation techniques are well known in the art.

The embodiment of motor system shown in FIG. 10 may physically appear precisely the same as the embodiment shown in FIG. 1. The electric motor 105 is substituted for the corresponding rotary phase converter 5, and the fan 39 is, of course, carried on its shaft. Likewise, the output motor 7 is replaced by the output motor 107, which differs only in its winding from the motor 7.

It will be seen that in this embodiment the use of the motor 105 as a transformer provides a constant speed fan motor for cooling the output motor 107 independent of the speed of the output motor. The three phase motor system of FIG. 10 will typically (although not necessarily) be a higher power motor system than the single phase system of FIGS. 1–9. The power rating of the phase converter of FIG. 10 will typically be about one-fifth that of the output motor 107. Thus, for a 5,000 watt (5 horsepower) motor 107, the phase converter motor 105 will be a 1,000 watt unit.

Figure 11:
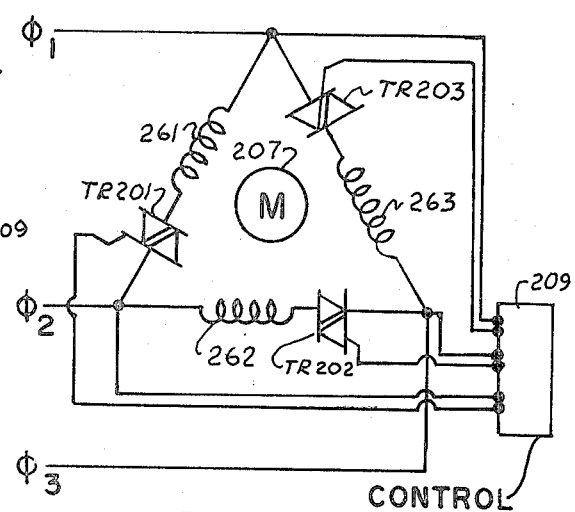
FIG. 11 is a schematic wiring diagram of another three-phase powered system utilizing a speed control of this invention.

An alternative approach for providing a variable speed induction motor of this invention, from a three phase power source, is shown in FIG. 11. As shown in FIG. 11, the variable speed motor 207 is a three phase motor, the three windings of which are electrically arranged in a delta connection with a gating means (triac) in each leg of the delta. In other words, a first winding 261 and first triac TR 201 are electrically connected in series between a first phase and a second phase of the three phase power source; a second winding 262 and second triac 202 are electrically connected in series between the second phase and the third phase of the power source; and a third winding 263 and third triac TR 203 are electrically connected in series between the third phase and the first phase of the power source. The triacs TR 201, TR 202, and TR 203 are controlled by a control circuit 209. Preferably, the control circuit 209 includes the preferred speed sensing means (tachometer) of the foregoing examples and also includes the circuitry of the foregoing examples, modified to accommodate a suitable power source (such as one of the phases of the three phase power source) and to provide a third firing circuit identical with the two firing circuits of the previous embodiments. Because the system does not provide a true ground connection, each of the firing circuits is connected between the gate of its associated triac and its associated phase. Likewise, the control circuit 209 is isolated from the triac gates and firing of the triacs is through a transformer coupling. Unlike the usual "Y" connected controllable three phase induction motor, the delta connected motor system of FIG. 11 provides fully balanced phase currents and operates smoothly across its entire speed range, with no point or area of instability.

Figure 12:
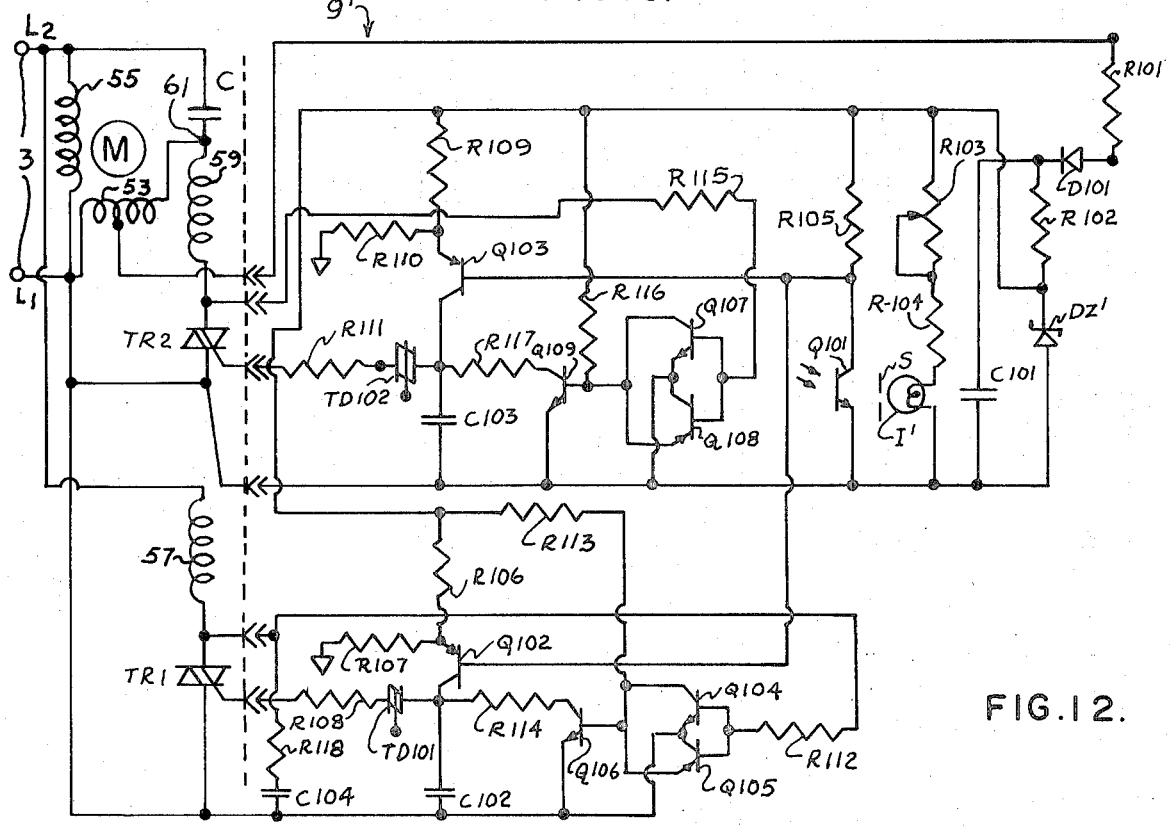
FIG. 12 is a schematic diagram, similar to FIG. 4, of a motor system of this invention, utilizing another control circuit.
Figure 13:
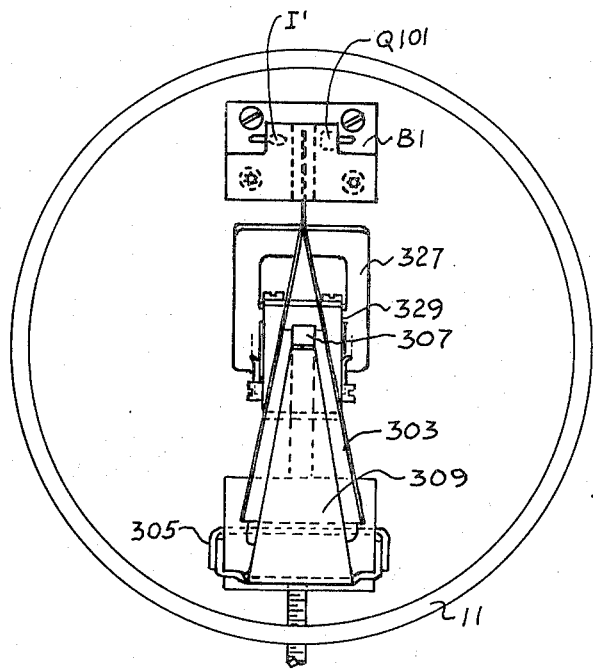
FIG. 13 is a sectional view, corresponding to FIG. 2, showing a speed sensing means (tachometer) for use in the motor system of FIG. 12.
Figure 14:
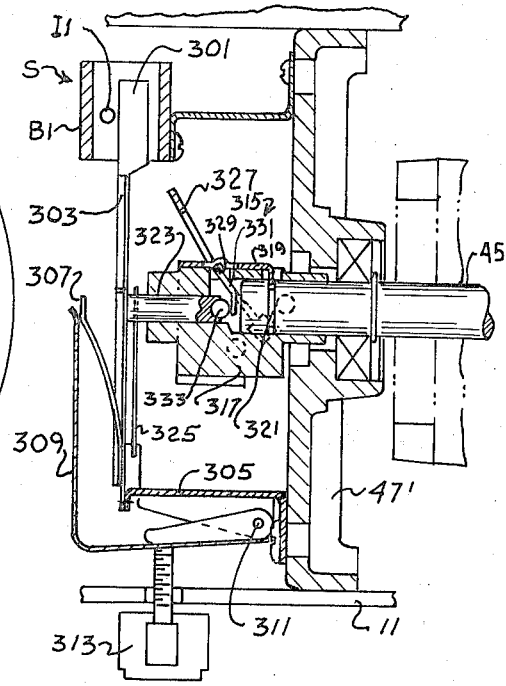
FIG. 14 is a detail in axial cross section, corresponding to FIG. 1, of a tachometer shown in FIG. 13.

Although the speed control system of FIGS. 1–11, which utilizes a digital (discrete pulse) tachometer and which utilizes each pulse from the tachometer to terminate a voltage ramp, is preferred, other entirely different tachometers and seed control systems may be utilized with the motor systems which have been described above. One such control system 9' is shown in FIGS. 12–14. As shown in FIG. 12, the control system 9' may be utilized by simple substitution to the motor system of FIGS. 1 and 4. Mechanically, this embodiment differs from the motor system shown in FIG. 1 only in the substitution of a mechanical force balance mechanism (described hereinafter) for the electronic tachometer disc 51 and conductor L1 and L2 mounting. The electronics circuit board 23 and heat sink 25 have been omitted from FIG. 14, but may be retained in this position if desired. Likewise, in FIG. 12 the reversing switch 19 is omitted, but may be retained if desired.

As shown in FIG. 12, the speed control circuit 9' includes a rectified power source consisting of resistor R101, diode D101, resistor R102, Zener diode Dz', and capacitor C101. This power supply is substantially the same as the rectified power supply of the preferred embodiment shown in FIG. 7.

Electrically connected across the power supply is a speed sensing means consisting of variable resistor R103, resistor R104 and incandescent bulb I', all connected in series, and of resistor R105 and light sensitive transistor (phototransistor) Q101 electrically connected in series. The resistor R103 acts as a sensitivity adjustment for the motor system. Between the bulb I' and the phototransistor Q101 is a shutter S which tends to close in response to an increase in motor speed above a preselected set speed. A centrifugally operated shutter which will perform the desired function is shown in FIGS. 13 and 14. As shown in these figures, the shutter S consists of mounting block B', in which are mounted the lamp I' and the phototransistor Q101, and which is itself mounted to the end shield 47' of the output motor 7. A shutter portion 301 of a wand 303 is freely movable into and out of the light path between the lamp I' and the phototransistor Q101. The wand 303 is hingedly mounted at its lower end to a bracket 305 which is in turn secured to the endshield 47'. The wand 303 is biased out of the light path (i.e., is biased to open the shutter) by a leaf spring 307 which is secured face-to-face with the wand 303 at its lower end and which is itself biased by an adjustment arm 309. The adjustment arm 309 is also pivotally connected to the bracket 305, as shown at 311. The force applied by the spring 307 is adjusted by an adjustment screw 313 threaded through the casing 11.

The force of the spring 307 on the wand 103 is counteracted by a centrifugal member 315 carried by the rotor shaft 45. The centrifugal member 315 includes a carrier block 317 having a bore into which is fitted the shaft 45. The mounting block 317 is secured against both axial and rotational movement with respect to the shaft 45 by a bifurcated L-shaped bracket 319 which is bolted to a radially outer face of the mounting block 317, and the legs of which straddle the shaft 45 and extend into grooves or flats 321 on opposite sides of the shaft 45. A push rod 323 is journaled in a bore at the axially opposite end of the block 317 from the shaft 45. The push rod 323 and shaft 45 are coaxial, and are axially spaced apart. An anti-spin wire 325, mounted on the bracket 305, extends through an eye in the push rod 323. The push rod 323 is moved axially against the wand 303 by a dynamically balanced, inclined centrifugal lever 327. The lever 327 is in the form of a yoke having a central cross bar 329 trapped between the mounting block 317 and the bracket 319. Lever 327 pivots on a corner edge of the cross bar 329. A depending tongue section 331 of the cross bar 329 extends between the shaft 45 and the push rod 323. The tongue 331 engages a ball bearing 333 at the axially inner end of the push rod 323. As the shaft 45 spins, the lever 327 pivots on the knife edge of the cross bar 329 and generates a torque moment which is transferred as a linear force to the non-rotating push rod 323. Therefore, as will be apparent, at any speed setting of the adjustment screw 313 the motor will quickly find a speed at which the lever 327 causes the wand 301 to interrupt the light path between the light source I' and the phototransistor Q101 just sufficiently to maintain a balance between the force exerted by the spring 307 and the lever 327. The balance point, that is the light intensity required to maintain motor speed, will of course vary somewhat with speed setting. However, the difference is quite small in relation to the total speed range of the motor. The design of the centrifugal member 315 is also such that the axial force generated by the push rod 323 is only slightly affected by end play of the motor shaft 45. Speeds above or below the balance point of the shutter S produce a decrease or increase, respectively, in the current flow through the phototransistor Q101. The phototransistor Q101 output directly controls two identical firing circuits. The main traic TR1 firing circuit includes transistor Q102, which controls the slope of the ramp voltage generated across capacitor C102 for firing triac TR1 through silicon bilateral switch TD 101 and resistor R108. Resistors R106 and R107 comprise a voltage divider which provides a constant potential on the emitter of transistor Q102. Therefore, current flow through the transistor Q102, hence the charging rate of capacitor C102, is controlled by the output signal applied to the base of transistor Q102 by the speed sensing means. The timing of the initiation of each ramp is controlled by a zero crossing detector made up of transistors Q104, Q105 and Q106 and resistors R112, R113 and R114. The zero crossing detector is responsive to voltage across triac TR1 as follows: When the voltage across triac TR1 is either substantially positive or substantially negative, the bias current through resistor R112 turns on transistor Q104 or transistor Q105, thereby turning off transistor Q106. Therefore, a ramp is generated across capacitor C102. When the voltage across the triac TR1 decreases to a low value, both transistor Q104 and transistor Q105 are off, thereby allowing bias current through resistor R113 to turn on transistor Q106 and thereby discharge capacitor C102. It will be seen that the connection of transistors Q104 and Q105 prevents line voltage from damaging either, because when the main triac terminal is positive the base-emitter junction of transistor Q104 is forward biased, thus limiting the reverse bias voltage on the base of transistor Q105; when the main triac terminal is strongly negative, the base-collector junction of transistor Q105 is forward biased, thus protecting transistor Q104. The zero crossing detector of this embodiment utilizes one more transistor than does the detector of the preferred embodiment, but because it uses a smaller number of resistors and because the tolerancing of the resistors may be very broad, this detector may be preferable in a monolithic design. The phase 2 triac firing circuit, as noted, is identical with the phase 1 firing circuit and includes a main control transistor Q103, voltage divider R109 and R110, silicon bilateral switch TD 102 and resistor R111, capacitor C103 and a zero crossing detector consisting of resistors R115, R116 and R117, and transistors Q107, Q108 and Q109. Resistor R118 and capacitor C104, as in the preferred embodiment, are required to provide proper commutation of the triacs under unusual speed and load conditions.

Merely by way of illustration, the following values and standard sources of the electronic components may be used in the circuit of FIG. 12:

| R101 | 800 ohms | R110 | 18K ohms |
|---|---|---|---|
| R102 | 680 ohms | R111 | 2.2K ohms |
| R103 | 500 ohms | R112 | 270K ohms |
| R104 | 220 ohms | R113 | 39K ohms |
| R105 | 22K ohms | R114 | 47 ohms |
| R106 | 2.2K ohms | R115 | 470K ohms |
| R107 | 18K ohms | R116 | 39K ohms |
| R108 | 47 ohms | R117 | 47 ohms |
| R109 | 2.2K ohms | R118 | 270 ohms |
| C101 | 100 microfarad, 100 volts | | |
| C102 | 0.1 microfarad, 100 volts | | |
| C103 | 0.1 microfarad, 100 volts | | |
| C104 | .068 microfarad, 600 volts | | |
| D101 | 1N5060 | | |
| DZ' | 1N964B (13 v.) | | |
| Q101 | MRD14B (Motorola) | Q106 | (NPN) 2N5225 |
| Q102 | (PNP) 2N5226 | Q107 | (NPN) 2N5225 |
| Q103 | (PNP) 2N5226 | Q108 | (PNP) 2N5226 |
| Q104 | (NPN) 2N5225 | Q109 | (NPN) 2N5225 |
| Q105 | (PNP) 2N5226 | | |
| TD101 | 2N4991 (Motorola) | | |
| TD102 | 2N4991 (Motorola) | | |
| I' | 10 CS (0.015 amps) (Sylvania) | | |

The speed control of FIGS. 12–14 has the drawbacks, as compared with the preferred embodiment, that it does not perform as well at low speeds, that it has a lower response rate to speed changes, that it is mechanically more complicated, that it involves the use of parts which are subject to friction and wear, and that it requires a light source which is subject to burning out and is sensitive to dirt. However, the system is electronically simpler, and within a speed range of 4:1 or more provides highly satisfactory speed-torque characteristics comparable to those of the preferred embodiment.

Figure 15:
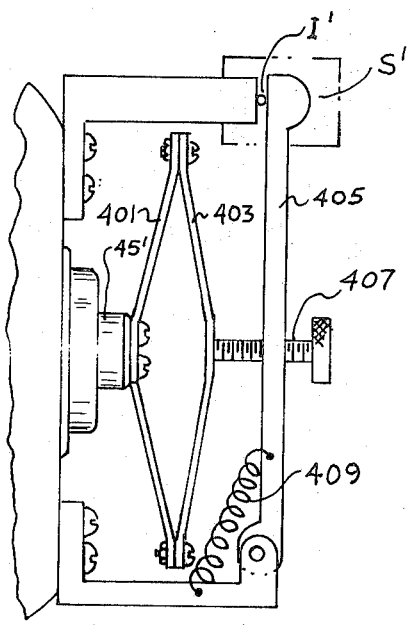
FIG. 15 is a view in side elevation of another tachometer for use in the motor system of FIG. 12.

Numerous other variations in the motor systems, speed controls, and tachometers of this invention, within the scope of the appended claims, will be apparent to those skilled in the art in the light of the foregoing disclosure. For example, the coupled reactive means of the first embodiment of tachometer may be capacitive rather than inductive, and in either case both reactive means may be placed on the same side of the rotating disc or other element carried by the motor shaft. Of course, when the reactive means are placed on the same side, the discrete means carried by the motor shaft must nonetheless pass through an air gap through which the reactive means are coupled so as to break or alter the coupling. The discrete means may consist merely of teeth between notches in the periphery of a conductive disc. Other mechanical governors may also be used to control the opening and closing of the shutter of the second (analog) tachometer in response to motor speed. For example, as shown in FIG. 15, a simple fly weight governor consisting of two spring arms 401 and 403 may control the movement of a shutter 405. The spring arms 401 and 403 are bowed apart at their center and are joined to the motor shaft 45 and the center of the second arm 403 acts as a bearing for a speed shutter 405. A spring 409 biases the shutter set screw 407 against the spring arm 403, toward a closed position. As the speed of the shaft 45 increases, the shutter 405 tends to close the light path between the light source I' and the phototransistor Q101.

Figure 16:
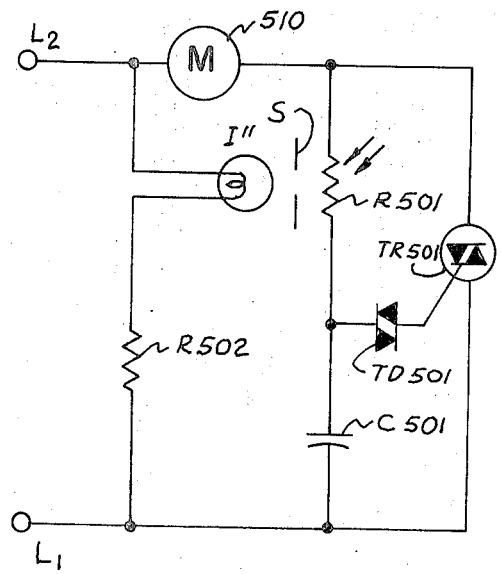
FIG. 16 is a schematic wiring diagram of another motor control system utilizing the tachometer of FIGS. 13-14 or of FIG. 15.

Although the use of the tachometers disclosed is particularly advantageous in the motor system of FIGS. 4 and 12, they also have utility in other motor systems and in other applications together. For example, as shown in FIG. 16, the tachometer of FIGS. 13 and 14 or FIG. 15 may be used in a simple single phase motor system for maintaining the shaft speed of a motor 510 at a variable predetermined speed regardless of load or line variations. In this motor system, the speed of motor 510 is controlled by the firing angle of triac TR501, which is in turn controlled by the charging rate (ramp voltage slope) of capacitor 501. This rate is controlled by photoresistor R501 which is illuminated by lamp I″ through a shutter S, as shown in FIGS. 13 and 14 or FIG. 15. Resistor 502 and triggering device 501 perform the same functions as in the circuit of FIG. 12. Although this motor system is extremely simple and lacks the starting torque and the speed range of the foregoing embodiments, it may be highly useful in numerous applications. The digital tachometer of FIGS. 2, 3, 6 and 7 may be utilized in numerous applications in which digital motion sensing means have heretofore been used, such as position sensing devices which count the number of revolutions of a drive wheel, or other metering or measuring applications in which magnetic or photosensitive pickups have been used heretofore. Its extreme accuracy and rejection of noise also make it ideal for such applications as ignition systems for internal combustion engines and the like. These variations are merely illustrative.

Having thus described the invention, what is claimed and desired to be secured by Letters Patent is:

1. An electric motor system adapted to operate from a single phase AC power source comprising phase converter means, adapted to be energized by said single phase power source, for providing a polyphase power source, said phase converter means comprising a rotary phase converter; a polyphase induction motor having first and second windings electrically connected to said polyphase power source, rotors of said rotary phase converter and said polyphase electric motor rotating mechanically independent of each other; cooling means driven by the rotor of said rotary phase converter for cooling said polyphase motor independent of the rotor speed of said polyphase motor; and control means for supplying power to said polyphase motor, and control means including first gating means electrically connected in series with said first winding and second gating means electrically connected in series with said second winding.

2. The electric motor system of claim 1 including speed sensing means for sensing the rotor speed of said polyphase motor, said control means comprising speed control means responsive to said speed sensing means for controlling said gating means to maintain said rotor speed at a preselected value.

3. The electric motor system of claim 2 wherein said speed sensing means comprise discrete means carried by said polyphase motor rotor, amplifier means having an input and an output, and variable feedback means electrically connected between said input and output for varying the feedback of said amplifier means in response to movement of one of said discrete means past said feedback means, said amplifier output being electrically connected to said control means.

4. The electric motor system of claim 2 wherein said speed control means comprise means for generating a ramp voltage, means responsive to said speed sensing means for terminating said ramp in response to rotation of said polyphase motor rotor through a predetermined angle, error sensing means for comparing the ramp height with a reference voltage and producing an error signal dependent on the relative magnitudes of said ramp height and said reference voltage, and timing logic means for controlling the "on" time of said gating means in response to the magnitude of said error signal.

5. The electric motor system of claim 4 including manually operable speed setting means for varying the slope of said ramp.

6. The electric motor system of claim 2 wherein said speed sensing means comprise first and second detector means coupled to each other through an air gap to produce an output signal; shutter means adapted to be moved in said air gap for varying the coupling of said first and second detector means, hence the magnitude of said output signal; and centrifugal governor means carried by said rotor of said polyphase motor for varying the position of said shutter, hence the magnitude of said output signal with changes in said rotor speed.

7. The electric motor system of claim 6 wherein said first and second detector means comprise a light source and a light-sensitive transistor.

8. The electric motor system of claim 1 wherein said cooling means comprise a fan carried by the rotor of said rotary phase converter, said fan being positioned axially between a stator of said phase converter and a stator of said polyphase motor, at least a part of said control means being positioned between said fan and said stator of said polyphase motor.

9. The electric motor system of claim 1 wherein said control means supplies power to said polyphase motor only when said rotary phase converter provides an output.

10. An electric motor system adapted to operate from a single phase power source comprising phase converter means, adapted to be energized by said single phase power source, for providing a polyphase power source, said phase converter means comprising a rotary phase converter; a polyphase induction motor having first and second windings electrically connected to said polyphase power source, rotors of said rotary phase converter and said polyphase electric motor rotating mechanically independent of each other; and control means for supplying power to said polyphase motor, said control means including first gating means electrically connected in series with said first winding and second gating means electrically connected in series with said second winding for controlling the part of each cycle of said polyphase power applied to said first and second winding respectively.

11. The electric motor system of claim 10 including speed sensing means for sensing the rotor speed of said polyphase motor, said control means comprising speed control means responsive to said speed sensing means for controlling said gating means to maintain said rotor speed at a preselected value.

12. The electric motor system of claim 10 wherein said control means supply power to said polyphase motor only when said rotary phase converter provides an output, said control means being energized by said phase converter.

13. An electric motor system adapted to operate from a single phase AC power source comprising rotary phase converter means, adapted to be energized by said single phase power source, for providing a two phase power source, said rotary phase converter being a permanent split capacitor motor including a main winding electrically connected between a first side and a second side of said single phase power source, and a capacitor and an aux winding electrically connected in series between said first and said second sides of said single phase power source, a first phase of said two phase power source being across said main winding from said first side to said second side of said single phase power source, a second phase of said two phase power source being across said aux winding from a point electrically between said capacitor and said aux winding to said second side of said single phase power source; a two phase induction motor having a first winding connected across said first phase and a second winding connected across said second phase, rotors of said rotary phase converter and said two phase motor rotating mechanically independent of each other; and control means for supplying power to said two phase motor, said control means including first gating means electrically connected in series with said first winding and second gating means electrically connected in series with said second winding.

14. The electric motor system of claim 13 including speed sensing means for sensing the rotor speed of said two phase motor, said control means comprising speed control means responsive to said speed sensing means for controlling said gating means to maintain said rotor speed at a preselected value.

15. The electric motor system of claim 14 wherein the turns ratio of said aux winding to said main winding of said rotary phase converter is at least about two.

16. An electric motor system adapted to operate from a primary AC power source comprising phase converter means, adapted to be energized by said AC power source, for providing a secondary polyphase power source, said phase converter means comprising a first polyphase induction motor having first and second windings; a second polyphase induction motor having first and second windings electrically connected to said secondary polyphase power source, rotors of said first motor and said second motor rotating mechanically independent of each other; and control means for supplying power to said second motor, said control means including first gating means electrically connected in series with said first winding of said second motor and second gating means electrically connected in series with said second winding of said second motor for controlling the part of each cycle of said polyphase power applied respectively to said first and second windings of said second motor.

17. The electric motor system of claim 16 including cooling means driven by the shaft of said first induction motor for cooling said second induction motor independent of the rotor speed of said second induction motor.

18. The electric motor system of claim 17 wherein said cooling means comprise a fan carried by a rotor of said first induction motor.

19. The electric motor system of claim 18 wherein rotors of said first and second induction motors are coaxial, said fan being positioned axially between a stator of said first induction motor and a stator of said second induction motor.

20. The electric motor system of claim 19 wherein at least a part of said control means are positioned between said fan and said stator of said second motor.

21. The electric motor system of claim 16 including speed sensing means for sensing the rotor speed of said polyphase motor, said control means comprising speed control means responsive to said speed sensing means for controlling said gating means to maintain said rotor speed at a preselected value.

22. The electric motor system of claim 21 wherein said speed sensing means comprise discrete means carried by, and fixed with respect to, said first induction motor rotor, amplifier means having an input and an output, and variable feedback means electrically connected between said input and output for varying the feedback of said amplifier means in response to movement of one of said discrete means past said feedback means, said amplifier output being electrically connected to said control means.

23. The electric motor system of claim 21 wherein said speed sensing means comprise a pair of reactive means coupled to each other through an air gap, a first circuit including one of said reactive means, a second circuit including the other of said reactive means, a sensing means for sensing a disturbance of said coupling of said reactive means, and discrete means carried by, and fixed with respect to, said first induction motor rotor, said discrete means being positioned for movement into and out of said air gap when said polyphase shaft rotates, for disturbing said coupling of said reactive means.

24. The electric motor system of claim 23 wherein said first and second circuits are oscillator circuits, and said sensing means comprise an amplifier, said first and second circuits being connected across said amplifier to form a variable feedback for said amplifier.

25. The electric motor system of claim 24 wherein said sensing means further comprise means for detecting the end of a burst of pulses through said amplifier and for producing a control signal in response thereto.

26. The electric motor system of claim 21 wherein said speed control means comprise means for generating a ramp voltage, means responsive to said speed sensing means for terminating said ramp in response to rotation of said rotor of said second motor through a predetermined angle, error sensing means for comparing the ramp height with a reference voltage and producing an error signal dependent on the relative magnitudes of said ramp height and said reference voltage, and timing logic means for changing the "on" time of said gating in response to the magnitude of said error signal.

27. The electric motor system of claim 26 including speed setting means, said speed setting means varying the slope of said ramp.

28. The electric motor system of claim 27 wherein said error sensing means further comprise variable gain means for relatively increasing the magnitude of said error signal as the motor speed setting is increased.

29. The electric motor system of claim 21 wherein said speed sensing means comprise first and second detector means coupled to each other through an air gap to produce an output signal; shutter means adapted to be moved in said air gap for varying the coupling of said first and second detector means, hence the magnitude of said output signal; and centrifugal governor means carried by said rotor of said second induction motor for varying the position of said shutter, hence the magnitude of said output signal with changes in said rotor speed.

30. The electric motor system of claim 29 wherein said first and second detector means comprise a light source and a light-sensitive transistor.

31. The electric motor system of claim 23 wherein said phase converter means provides a two phase power source and said second induction motor is a two phase motor.

32. The electric motor system of claim 31 including reversing switch means for reversing the excitation connections of one of said first and second windings.

33. The electric motor system of claim 31 wherein said AC power source is a three phase source, said first winding of said first induction motor being electrically connected between a first and third phase of said AC power source and said second winding of said first induction motor being connected between a second phase of said AC power source and a center tap on said first winding, said two phase power source including a first connection between said first phase and said third phase, and a second connection between said second phase and said center tap.

34. An electric motor system including an AC induction motor and a control system for maintaining the rotor speed of the AC induction motor at a preselected value comprising gating means for controlling the part of each cycle of alternating power supplied to a winding of said motor, speed sensing means for sensing the rotor speed of said motor, and speed control means responsive to said speed sensing means for controlling said gating means to maintain said rotor speed at a preselected value, said speed sensing means comprising amplifier means having an input and an output, and variable feedback means electrically connected between said input and output, said feedback means comprising first means electrically connected to said input, second means electrically connected to said output, and a plurality of discrete means carried by said rotor for providing a variable coupling between said first means and said second means and thus for varying the feedback of said amplifier means in response to movement of one of said discrete means past said feedback means, said amplifier output being electrically connected to said speed control means.

35. An electric motor system including an AC induction motor and a control system for maintaining the rotor speed of the AC induction motor at a preselected value comprising gating means for controlling the part of each cycle of alternating power supplied to a winding of said motor, speed sensing means for sensing the rotor speed of said motor, and speed control means responsive to said speed sensing means for controlling said gating means to maintain said rotor speed at a preselected value, said speed sensing means comprising a pair of reactive means coupled to each other through an air gap, a first circuit including one of said reactive means, a second circuit including the other of said reactive means, sensing means for sensing a disturbance of said coupling of said reactive means, and discrete means carried by said rotor, positioned for movement into and out of said air gap when said rotor rotates, for disturbing said coupling of said reactive means.

36. The electric motor system of claim 35 wherein said first and second circuits are high frequency oscillator circuits, and said sensing means comprise an amplifier, said first and second circuits being connected across said amplifier to form a variable feedback for said amplifier.

37. The electric motor system of claim 36 wherein said sensing means further comprise means for detecting the end of a pulse train through said amplifier and producing a control signal in response thereto.

38. An electric motor system including an AC induction motor and a control system for maintaining the rotor speed of the AC induction motor at a preselected value comprising gating means for controlling the part of each cycle of alternating power supplied to a winding of said motor, speed sensing means for sensing the rotor speed of said motor and speed control means responsive to said speed sensing means for controlling said gating means to maintain said shaft speed at a preselected value, said speed control means comprising means for generating a ramp voltage, means responsive to said speed sensing means for terminating said ramp in response to rotation of said motor shaft through a predetermined angle, error sensing means for comparing the height of each ramp with a reference voltage and producing an error signal for each said ramp, said error signal being dependent on the height of said ramp relative to said reference voltage, sample and hold means for holding a signal dependent on the magnitude of only the last generated said error signal, and timing logic means for controlling the "on" time of said gating means in response to the magnitude of said sample and hold means signal.

39. The electric motor system of claim 38 including variable speed setting means, said speed setting means varying the slope of said ramp.

40. The electric motor system of claim 38 wherein said motor is a polyphase motor having first and second main windings, a first source of alternating power and a second source of alternating power out of phase with said first source, said gating means being electrically connected in series with said first source and said first winding and in series with said second source and said second winding.

41. An electric motor system including an AC induction motor and a control system for maintaining the rotor speed of the AC induction motor at a preselected value comprising sensing means for producing a signal in response to rotation of the rotor through a predetermined angle, means for producing a voltage ramp, means responsive to said signal for terminating said voltage ramp, and means including sample and hold means responsive to the height of only the last generated voltage ramp for controlling said rotor speed.

42. An electric motor system including an AC induction motor and a control system for maintaining the rotor speed of the AC induction motor at a preselected value comprising gating means for controlling the part of each cycle of alternating power supplied to a winding of said motor, speed sensing means for sensing the rotor speed of said motor and speed control means responsive to said speed sensing means for controlling said gating means to maintain said rotor speed at a variable preselected value, said speed control means comprising means for generating a first error signal substantially proportional to the ratio between the speed sensed by the speed sensing means and the preselected speed value; amplifier means responsive to said first error signal for producing a second error signal; variable gain means for increasing the gain of said amplifier means in response to an increase in said preselected speed value; and timing logic means for controlling the "on" time of said gating means in response to the magnitude of said second error signal.

43. An electric motor system including an AC induction motor and a control system for maintaining the shaft speed of the AC induction motor at a preselected value comprising gating means for controlling the part of each cycle of alternating power supplied to a winding of said motor, speed sensing means for sensing the shaft speed of said motor, and speed control means responsive to said speed sensing means for controlling said gating means to maintain said shaft speed at a preselected value, said speed sensing means comprising first and second detector means coupled to each other through an air gap to produce an output signal; shutter means adapted to be moved in said air gap for varying the coupling of said first and second detector means, hence the magnitude of said output signal; and centrifugal governor means carried by said rotor of said polyphase motor for varying the position of said shutter, hence the magnitude of said output signal with changes in said rotor speed.

44. The electric motor system of claim 43 wherein said first and second detector means comprise a light source and a light-sensitive transistor.

45. An electric motor system adapted to operate from a three phase AC power source comprising a three phase motor having three windings, a first of said windings being electrically connected between a first of said phases and a second of said phases, a second of said windings being electrically connected between said second phase and a third of said phases, and a third of said windings being connected between said third phase and said first phase; gating means for controlling the part of each cycle of power applied to each of said windings, said gating means comprising a first solid state switch electrically connected in series between said first winding and said second phase, a second solid state switch electrically connected between said second winding and said third phase, and a third solid state switch electrically connected between said third winding and said first phase; and control means for controlling the "on" time of each of said solid state switches.

46. An electric motor system adapted to operate from a three phase AC power source comprising phase converter means for converting said three phase power to two phase power, a two phase motor electrically connected to said phase converter means, and control means electrically connected between said phase converter output and said two phase electric motor, said control means including gating means for controlling the part of each cycle of said two phase power applied to each winding of said two phase electric motor, speed sensing means for sensing the shaft speed of said two phase electric motor, and speed control menas responsive to said speed sensing means for controlling said gating means to maintain said shaft speed at a preselected value.

* * * * *